US012674006B2

(12) United States Patent
Leprince et al.

(10) Patent No.: US 12,674,006 B2
(45) Date of Patent: Jul. 7, 2026

(54) MODIFIED HYALURONIC ACID AS DOPANT FOR PEDOT AND/OR PProDOT POLYMERS

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE GRENOBLE ALPES, Saint-Martin d'Heres (FR)

(72) Inventors: Maxime Leprince, Grenoble (FR); Rachel Auzely, Le Pont de Claix (FR); Isabelle Texier-Nogues, Grenoble (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE GRENOBLE ALPES, Saint-Martin d'Heres (FR)

( * ) Notice: Subject to any disclaimer, the term of this patent is extended or adjusted under 35 U.S.C. 154(b) by 0 days.

(21) Appl. No.: 18/258,043

(22) PCT Filed: Dec. 16, 2021

(86) PCT No.: PCT/EP2021/086162

§ 371 (c)(1),
(2) Date: Jun. 16, 2023

(87) PCT Pub. No.: WO2022/129317

PCT Pub. Date: Jun. 23, 2022

(65) Prior Publication Data

US 2024/0043574 A1 Feb. 8, 2024

(30) Foreign Application Priority Data

Dec. 17, 2020 (FR) ..................................... 20 13446

(51) Int. Cl.
*C08B 37/08* (2006.01)
*C08J 3/075* (2006.01)
(Continued)

(52) U.S. Cl.
CPC ........... *C08B 37/0072* (2013.01); *C08J 3/075* (2013.01); *C08J 3/24* (2013.01); *C08L 65/00* (2013.01);
(Continued)

(58) Field of Classification Search
CPC ... C08B 37/0072; C09D 11/102; C09D 11/52; C08J 2355/00; C08J 2381/00;
(Continued)

(56) References Cited

U.S. PATENT DOCUMENTS 6,027,741 A 2/2000 Cialdi et al.
6,051,701 A 4/2000 Cialdi et al.
(Continued)

FOREIGN PATENT DOCUMENTS

CN 111303459 A 6/2020

OTHER PUBLICATIONS

International Search Report issued Mar. 18, 2022 in PCT/EP2021/086162, filed on Dec. 16, 2021, 3 pages.
(Continued)

*Primary Examiner* — Tri V Nguyen
(74) *Attorney, Agent, or Firm* — Oblon, McClelland, Maier & Neustadt, L.L.P.

(57) ABSTRACT

A polymer of hyaluronic acid modified by the grafting thereto of at least one of the functions —$SO_3^-$ and aromatic rings may be used as dopant for a polymer formed from one or monomers chosen from EDOT, ProDOT, and derivatives thereof. An aqueous suspension, or ink, and materials, in particular hydrogels, based on at least one PEDOT and/or PProDOT polymer may be doped by at least one such
(Continued)

modified hyaluronic acid polymer. Such modified hyaluronic acid polymers may be used in bioelectronic or biosensor devices.

24 Claims, 5 Drawing Sheets

(51) Int. Cl.
*C08J 3/24* (2006.01)
*C08L 65/00* (2006.01)
*C09D 11/102* (2014.01)
*C09D 11/52* (2014.01)

(52) U.S. Cl.
CPC ............ *C09D 11/102* (2013.01); *C09D 11/52* (2013.01); *C08J 2355/00* (2013.01); *C08J 2405/08* (2013.01)

(58) Field of Classification Search
CPC .......... C08J 2405/08; C08J 3/075; C08J 3/24; C08L 5/08
USPC .......................................... 252/500, 510, 511
See application file for complete search history.

(56) References Cited

U.S. PATENT DOCUMENTS 6,339,074 B1 1/2002 Cialdi et al.
2004/0131651 A1* 7/2004 Panero .................... A61L 27/50 514/54

OTHER PUBLICATIONS

French Preliminary Search Report issued Sep. 7, 2021 in FR Application 20 13446, filed on Dec. 17, 2020, , 3 pages (with English Translation of Categories of Cited Documents).
Wang et al. "Fabrication and characterization of conductive poly (3,4-ethylenedioxythiophene) doped with hyaluronic acid/poly (L-lactic acid) composite film for biomedical application", Journal of Bioscience and Bioengineering, vol. 123, No. 1, 2017, 10 pages.
Proctor et al. "An Electrocorticography Device with an Integrated Microfluidic lon Pump for Simultaneous Neural Recording and Electrophoretic Drug Delivery In Vivo", Advanced Biosystems 3, 1800270 (2019); 6 pages.
Ludwig et al., "PEDOT polymer coatings facilitate smaller neural recording Electrodes", J. Neural Eng. 8, 014001 (2011); 14 pages.
Zhang et al., "Room-Temperature-Formed PEDOT: PSS Hydrogels Enable Injectable, Soft, and Healable Organic Bioelectronics", Advanced Materials 32, 1904752 (2020); 7 pages.
Tekoglu et al., "Conducting Polymer-Based Biocomposites Using Deoxyribonucleic Acid (DNA) as Counterion", Adv. Mater. Technol. 5, 1900699 (2020); 8 pages.
Horikawa et al., "The development of a highly conductive PEDOT system by doping with partially crystalline sulfated cellulose and its electric conductivity", J. Mater. Chem. C3, 8881-8887 (2015); 7 pages.
Hofmann et al., "How To Choose Polyelectrolytes for Aqueous Dispersions of Conducting PEDOT Complexes", Macromolecules 50, 1959-1969 (2017); 11 pages.
Harman et al., "Poly(3,4-ethylenedioxythiophene): Dextran sulfate (PEDOT: DS)—A highly processable conductive organic biopolymer", Acta biomaterialia 14, 33-42 (2015); 33 pages.
Hao et al., "Chemical Synthesis of Biomimetic Hydrogels for Tissue Engineering" Polym Int. 2017, 66(12): 1787-1799; 27 pages.
Mantione et al., "Poly(3,4-ethylenedioxythiophene): GlycosAmino-Glycan Aqueous Dispersions: Toward Electrically Conductive Bioactive Materials for Neural Interfaces", Polymers 2017, 9, 354; 12 pages.

* cited by examiner

MODIFIED HYALURONIC ACID AS DOPANT FOR PEDOT AND/OR PProDOT POLYMERS

CROSS-REFERENCE TO RELATED APPLICATIONS

The present application is the national stage of international application PCT/EP2021/086162, filed on Dec. 16, 2021, and claims the benefit of the filing date of French Appl. No. 2013446, filed on Dec. 17, 2020.

TECHNICAL FIELD

The invention aims to propose a modified polysaccharide, more precisely derived from hyaluronic acid, as dopant for a conductive polymer of the PEDOT (poly(3,4-ethylenedioxythiophene)) and/or PProDOT (poly(3,4-propylenedioxythiophene)) type, for preparing a biodegradable conductive ink, and innovative materials, combining good properties in terms of conduction, biocompatibility and biodegradability.

These inks and materials find particularly advantageous applications in the design of implantable bioelectronic devices or biological sensors, in particular to serve as interfaces with biological tissues.

PRIOR ART

The development of implantable electronic devices for monitoring or stimulating biological tissues is based on the use of flexible, deformable, and stretchable electronic compounds. A "technological" route for achieving such devices consists of embedding conventional conductors, based on copper, iron, or gold, in flexible matrices, or designing them with particular forms (for example, in the form of wavelets to withstand deformation, kirigami, etc.) [1], [2]. The use of conductive polymers offers a "chemical" answer that is more appropriate to these needs, since the physicochemical properties of materials based on polymers can be adjusted more finely, and the costs of production are lower.

For some years, conductive polymers have thus been used more and more in bioelectronics, being particularly suitable for the electrode/biological tissues interface, on account of their conductivity, which is both ionic and electronic. Among the polymers, PEDOT is one of the most suitable conductive polymers for implanted devices, on account of its great chemical stability and its very good biocompatibility ([3], [4]). More recently, it has also been proposed to take advantage of polymers formed from ProDOT (3,4-propylenedioxythiophene), a molecule with a structure very similar to that of EDOT (3,4-ethylenedioxythiophene) [48].

To be good conductors, these polymers of the polydioxythiophene type (PEDOT or PProDOT) must, however, be doped with another molecule (called "dopant"). Accordingly, to improve the stability and application of polydioxythiophenes, in particular PEDOT, polyelectrolytes have been proposed as dopants.

In particular, PEDOT doped with polystyrene sulfonate (PSS), designated PEDOT:PSS, has become the material of choice, on account of its chemical stability, its biocompatibility and the very wide range of conductivity that is possible (from $10^{-4}$ to $10^{4}$ S/cm) by means of chemical modifications or secondary treatments ([8]-(13]). Thus, PEDOT:PSS is available commercially in the form of an aqueous colloidal suspension, described as "ink", for example marketed by Heraeus under the trademark Clevios™. PEDOT:PSS is widely used for example for preparing intracranial electrodes ([5], [6], [7]).

However, PEDOT:PSS is not biodegradable, and the conductive tracks based on PEDOT:PSS, once deposited, are still soluble in water, which makes it difficult to use them in a biological environment, which is necessarily wet. To overcome this drawback, it has been proposed to incorporate PEDOT:PSS between two polymer membranes (for example, of the PLGA (poly(lactide-co-glycolide)) or polyurethane type, or else crosslink it with silylated crosslinking agents (for example, 3-glycidoxypropyltriethoxysilane (GOPS)) or divinylsulfone, unfortunately to the detriment of their cytocompatibility.

To increase cytocompatibility, other natural polyelectrolytes have been proposed for doping PEDOT, such as DNA ([14], [15]), cellulose [16], pectin [17], guar gum [18], κ-carrageenans ([19], [20]), alginate [21], ulvan (sulfated polysaccharide) [21], polydopamine or sulfated dextran [23]. The resultant PEDOT:polyelectrolyte materials have better biocompatibility, but are only slightly conductive (<$10^{-1}$ S/cm). PEDOT:glycosaminoglycan inks (GAGs) have also been proposed. The glycosaminoglycans are natural polysaccharides, consisting of a disaccharide chain, and they are present naturally in the human body. GAGs prove particularly advantageous as dopants for PEDOT for applications for implantable electronic devices. In fact, they advantageously have excellent biocompatibility, allow good interactions with neuronal cells, and their main chain can be hydrolyzed by the body. As examples, inks have been developed based on PEDOT doped with heparin, sulfated chondroitin or hyaluronic acid. However, these inks have low conductivity (0.001-0.075 S/cm), and their degradation by the body has not been studied.

SUMMARY OF THE INVENTION

The present invention aims more precisely to propose a new polyelectrolyte for doping PEDOT and/or PProDOT polymers, allowing the aforementioned drawbacks to be overcome, and combining excellent properties in terms of conductivity, biocompatibility and biodegradability.

More particularly, according to a first aspect, the invention relates to the use of a polymer of hyaluronic acid, or hyaluronic acid modified by grafting at least $—SO_3^-$ functions and aromatic rings thereon, as dopant for a polymer formed from one or more monomers selected from 3,4-ethylenedioxythiophene (EDOT), 3,4-propylenedioxythiophene (ProDOT) and derivatives thereof, in particular a polymer of the type poly(3,4-ethylenedioxythiophene) (PEDOT).

Hereinafter, a modified hyaluronic acid polymer used according to the invention will be designated more simply as "modified hyaluronic acid" or "modified HA" according to the invention.

The $—SO_3^-$ functions and the aromatic rings carried by the modified hyaluronic acid according to the invention may be carried on one and the same group (called "graft"), grafted on the hyaluronic acid chain, or alternatively may be carried by separate grafts.

As detailed hereinafter, according to a particular embodiment, the modified hyaluronic acid according to the invention may have at least $—SO_3^-C^+$ groups, $C^+$ being a counterion of the $SO_3^-$ anion such as $Na^+$, in particular grafted at the level of at least some of the hydroxyl functions of the hyaluronic acid polymer and groups possessing at least one aromatic ring, in particular a benzene ring, in particular grafted at the level of at least some of the carboxylic acid functions of the hyaluronic acid polymer.

Examples of modified hyaluronic acid polymers according to the invention, and of their synthesis, are described more particularly hereunder.

In particular, according to another aspect, the invention relates to a hyaluronic acid polymer modified by grafting at least —$SO_3^-$ functions and aromatic rings thereon, in which said —$SO_3^-$ functions and said aromatic rings are carried by separate groups grafted on the hyaluronic acid chain, said modified hyaluronic acid polymer having at least:

—$SO_3^-C^+$ groups, $C^+$ being a counterion of the $SO_3^-$ anion; and groups possessing at least one aromatic ring, in particular a benzene ring, said groups being grafted at the level of at least some of the carboxylic acid functions of the hyaluronic acid polymer, via amide bonds.

According to a particularly advantageous variant embodiment, the modified hyaluronic acid according to the invention is further modified by grafting at least one crosslinkable function thereon.

The polymers (homopolymers and copolymers) formed from one or more monomers selected from EDOT, ProDOT and derivatives thereof will be designated more simply hereinafter as "PEDOT and/or PProDOT polymers".

The complex formed from one or more PEDOT and/or PProDOT polymers, doped with at least one modified hyaluronic acid according to the invention, is more particularly designated hereinafter as "PEDOT/PProDOT:modified HA".

As illustrated in the examples given hereunder, the inventors have discovered that the use of a modified hyaluronic acid according to the invention as dopant for a polymer of the PEDOT type, makes it possible to produce particularly advantageous conductive inks, simultaneously having properties of high conductivity, biocompatibility but also biodegradability.

Thus, according to another of its aspects, the invention relates to an aqueous suspension, more commonly called "ink", comprising at least one PEDOT and/or PProDOT polymer doped with at least one modified hyaluronic acid according to the invention.

Advantageously, the ink may be an ink suitable for inkjet printing, for example for printing conductive tracks based on PEDOT/PProDOT:modified HA.

The invention also relates to a method for preparing said ink, using polymerization of EDOT and/or ProDOT monomers in a solution comprising at least one modified hyaluronic acid polymer according to the invention in an aqueous medium.

In particular, an ink based on a PEDOT and/or PProDOT polymer doped with a modified hyaluronic acid according to the invention, having free carboxylic acid functions and/or bearing crosslinkable functions, is advantageously crosslinkable.

According to another of its aspects, the invention also relates to a material, in particular a hydrogel, based on at least one PEDOT and/or PProDOT polymer doped with at least one modified hyaluronic acid polymer as defined according to the invention. The hydrogels based on PEDOT/PProDOT:modified HA according to the invention may be swollen in aqueous medium (also called "wet hydrogels") or may be dry. They may be for example in the form of films of conductive hydrogel, supported by a substrate or self-supporting.

The invention also relates to three variants of a method for preparing these hydrogels based on PEDOT/PProDOT:modified HA according to the invention.

According to a first variant embodiment, a hydrogel based on PEDOT/PProDOT:modified HA according to the invention may be prepared on the basis of crosslinking of an ink according to the invention based on PEDOT and/or PProDOT polymer(s) doped with a modified hyaluronic acid according to the invention and bearing crosslinkable functions.

According to another variant embodiment, a hydrogel based on PEDOT/PProDOT:modified HA according to the invention may also be obtained starting from a crosslinked hydrogel formed beforehand from at least one modified hyaluronic acid polymer and bearing crosslinkable functions, by proceeding with the polymerization of the EDOT and/or ProDOT monomers directly in the hydrogel based on modified HA, swollen in an aqueous medium.

According to yet another variant embodiment, a hydrogel based on PEDOT/PProDOT:modified HA according to the invention may be prepared by proceeding simultaneously with polymerization of the EDOT and/or ProDOT monomers and with crosslinking of said modified hyaluronic acid polymer having free carboxylic acid functions.

The inks and materials, in particular hydrogels, based on PEDOT/PProDOT:modified HA according to the invention, prove advantageous in several respects for application in the biomedical field, in particular for bioelectronic devices or implantable biosensors.

Firstly, they have excellent electrical conductivity, in particular in physiological conditions (pH 7.4 in aqueous medium), without requiring additional treatment or doping. In particular, they may have conductivity greater than or equal to 0.1 S/cm, in particular greater than or equal to 0.5 S/cm.

Moreover, the ink and the materials based on PEDOT/PProDOT:modified HA according to the invention have excellent biocompatibility or cytocompatibility.

Furthermore, they are advantageously biodegradable.

The biocompatible character of the ink and materials based on PEDOT/PProDOT:modified HA according to the invention ensures the possibility of putting them in contact with biological tissues. Their biodegradable character allows, after usage, their gradual elimination from the human body, without the need for explant surgery.

Advantageously, the hydrogels formed according to the invention have excellent properties of conformability. They thus adapt perfectly to biological tissues.

The materials according to the invention, in particular of the hydrogel type, may be integrated at the level of electronic devices (bioelectronic devices or biosensors) in contact with biological material (cells, living organisms or implanted in vivo). For example, they may be used in contact with cell cultures or tissues ex vivo, for example for the design of "organs on a chip", to be integrated in devices or sensors worn by a patient or implantable, in particular used for monitoring or stimulating biological tissues. They may advantageously constitute the interface with biological tissues.

They may thus find particularly advantageous applications in the design of many temporary implantable medical devices, such as guides for reconstruction of tissues (peripheral nerves, muscles), intracranial electrodes, for example in the treatment of Parkinson's disease or epilepsy, or for various implanted biosensors.

Thus, according to another of its aspects, the invention relates to the use of an aqueous suspension or a material, in particular a hydrogel, according to the invention, in particular such as prepared by the methods according to the invention, in a bioelectronic device or biosensor intended to be brought into contact with biological material, for example for a device in contact with cell cultures or tissues ex vivo, a device or sensor carried or worn by a patient, or implantable, such as guides for the reconstruction of tissues, for example peripheral nerves.

It further relates to a bioelectronic device or biosensor intended to be brought into contact with biological material, comprising at least one material, in particular a hydrogel, according to the invention.

Other characteristic features, variants and advantages of the modified hyaluronic acid according to the invention, and of its use as dopant for a PEDOT and/or PProDOT polymer, will become clearer on reading the description and examples given hereunder for purposes of illustration, and not limiting the invention.

Hereinafter, the expressions "between . . . and . . . ", "from . . . to . . . " and "ranging from . . . to . . . " are equivalent and are intended to signify that the limits are included, unless stated otherwise.

DETAILED DESCRIPTION

Modified Hyaluronic Acid

Figure 1:
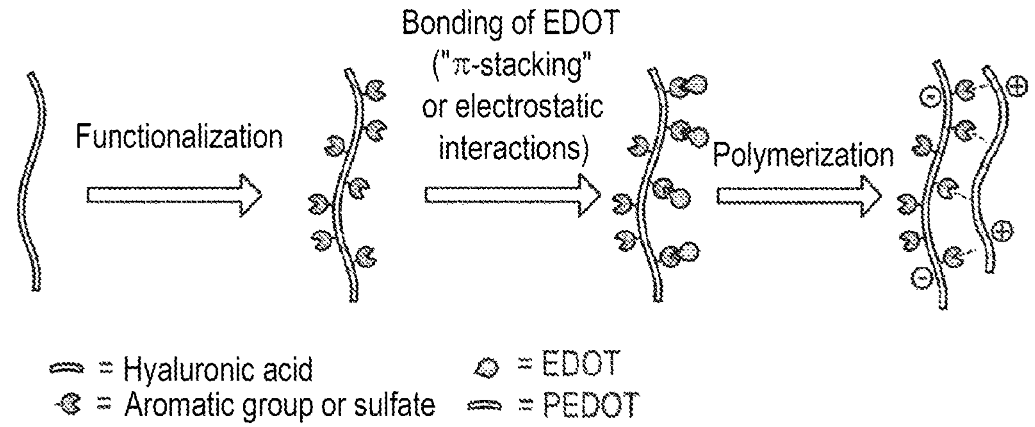
FIG. 1 shows, schematically, the formation of a PEDOT: modified HA complex starting from the polymerization of EDOT monomers in the presence of chains of modified hyaluronic acid according to the invention.

As already mentioned, the present invention employs a modified hyaluronic acid polymer, bearing at least —$SO_3^-$ functions and aromatic rings.

Hyaluronic acids are polymers formed from disaccharide units consisting of D-glucuronic acid and N-acetyl-D-glucosamine, as shown schematically below.

[Chem 1]

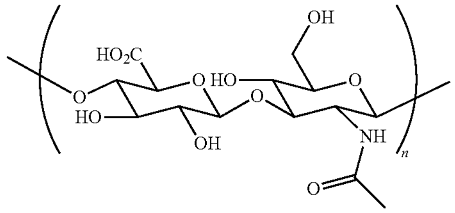

It is to be understood that the term "hyaluronic acid" denotes both hyaluronic acid in protonated form and in the form of salts. In particular, the modified hyaluronic acid according to the invention may be in the form of a salt, in particular an alkali metal salt, for example in the form of sodium hyaluronate.

"Repeat unit" or "unit" of the hyaluronic acid polymer means a disaccharide unit as presented above for unmodified hyaluronic acid.

The modified hyaluronic acid polymer according to the invention is obtained more particularly from a hyaluronic acid having a weight-average molecular weight, designated Mw, between 20 000 and 1 000 000 g·mol−[1], in particular between 40 000 and 250 000 g·mol−[1]. The weight-average molecular weight may be determined for example by size-exclusion chromatography (SEC).

According to a particular embodiment, the modified hyaluronic acid polymer according to the invention is formed by grafting one or more grafts bearing —$SO_3^-$ functions and aromatic rings, on a hyaluronic acid of weight-average molecular weight as defined above.

The —$SO_3^-$ functions and aromatic rings may more particularly be grafted at the level of some or all of the hydroxyl functions and/or of the carboxylic acid function of a repeat unit of the hyaluronic acid.

One or more —$SO_3^-$ functions and one or more aromatic rings may be carried on one and the same group grafted on the hyaluronic acid polymer, also called "graft", or alternatively may be carried by separate grafts.

According to a particular variant embodiment, the —$SO_3^-$ functions and aromatic rings are carried by separate grafts.

In particular, a modified hyaluronic acid according to the invention may result from the grafting on the hyaluronic acid of at least:

(a) —$SO_3^-$ $C^+$ groups, with $C^+$ representing a counterion of the —$SO_3^-$ anion, in particular selected from the alkali and alkaline-earth cations, for example $Na^+$; and (b) groups possessing at least one aromatic ring.

The —$SO_3^-$ $C^+$ groups may more particularly be grafted at the level of at least some of the hydroxyl functions of the hyaluronic acid. These are then called sulfate functions (—$OSO_3^-$ $C^+$) carried by the modified hyaluronic acid according to the invention.

The groups possessing at least one aromatic ring may more particularly be groups possessing a single aromatic ring.

The aromatic rings may be for example benzene rings, naphthalene rings, etc. They may also be aromatic rings bearing heteroatoms, for example pyridine or quinoleic rings, etc.

According to a particular embodiment, the aromatic rings are benzene rings.

The groups possessing at least one aromatic ring, for example a benzene ring, may more particularly be grafted at the level of at least some of the carboxylic acid functions of hyaluronic acid. They may for example be grafted to hyaluronic acid via amide bonds (—C(O)—NH—).

The groups bearing at least one aromatic ring, grafted on the modified hyaluronic acid according to the invention, may more particularly result from grafting, at the level of the hyaluronic acid, of molecules possessing at least one aromatic ring and bearing at least one function able to react with a carboxylic acid function of a hyaluronic acid unit to form a covalent bond. Said function may for example be an amine function able to react with a carboxylic acid function of a hyaluronic acid unit to form an amide bond.

As an example, the group bearing at least one aromatic ring may result from the grafting of aminophenylboronic acid (designated PBA) with a carboxylic acid function of the hyaluronic acid.

In a particular embodiment, the modified hyaluronic acid polymer according to the invention bears at least (a) —$SO_3^-$ $C^+$ groups, with $C^+$ being as defined above, grafted at the level of at least some of the hydroxyl functions of the hyaluronic acid and at least (b) groups possessing at least one aromatic ring, in particular a benzene ring, grafted at the level of at least some of the carboxylic acid functions of hyaluronic acid.

In particular, according to one of its aspects, the invention further relates to a hyaluronic acid polymer modified by the grafting thereon of at least —$SO_3^-$ functions and aromatic rings, said modified hyaluronic acid polymer having at least:

—$SO_3^-C^+$ groups, $C^+$ being a counterion of the $SO_3^-$ anion, in particular selected from the alkali and alkaline-earth cations, for example $Na^+$, said —$SO_3$—$C^+$ groups being in particular grafted at the level of at least some of the hydroxyl functions of the hyaluronic acid polymer; and groups possessing at least one aromatic ring, in particular a benzene ring, said groups being grafted at the level of at least some of the carboxylic acid functions of the hyaluronic acid polymer, via amide bonds.

In particular, the modified hyaluronic acid polymer according to the invention may in particular have an average number of —$SO_3^-$ functions, per repeat unit of the hyaluronic acid (corresponding to a disaccharide unit), between 1 and 4, in particular between 2 and 4, preferably between 3 and 4 and more preferably of 4.

According to a particular embodiment, the $SO_3^-$ functions result from the grafting of —$SO_3^-$ $C^+$ groups, at the level of all the functions or some of the hydroxyl functions of the hyaluronic acid, the degree of substitution of the hydroxyl functions with —$SO_3^-$ $C^+$ groups, defined as the average number of —$SO_3^-$ $C^+$ groups per repeat unit of the hyaluronic acid, also called in this case "degree of sulfation" and designated $DS_S$, being more particularly between 1 and 4, in particular between 2 and 4, preferably between 3 and 4.

In a particular embodiment, the degree of sulfation is 4. In other words, all the hydroxyl functions of the hyaluronic acid are substituted with sulfate functions (—$OSO_3^-$).

The degree of substitution with —$OSO_3^-$ functions can be determined by techniques known by a person skilled in the art, in particular based on determination of the mass fractions of sulfate and of glucuronic acid, as detailed in example 1 given hereunder.

A modified hyaluronic acid polymer according to the invention may have an average number of aromatic rings per repeat unit of the hyaluronic acid between 0.05 and 0.5, in particular between 0.10 and 0.40 and more particularly between 0.15 and 0.3.

According to a particular embodiment, the aromatic rings are carried by groups grafted at the level of at least some of the carboxylic acid functions, the degree of substitution of the carboxylic acid functions with said groups bearing an aromatic ring, in particular a benzene ring, designated $DS_{Ar}$, defined as the average number of groups possessing an aromatic ring per repeat unit of the hyaluronic acid, being more particularly between 0.05 and 0.5, in particular between 0.10 and 0.40 and more particularly between 0.15 and 0.3.

The degree of substitution with grafts bearing aromatic rings can be determined by techniques known by a person skilled in the art, for example by $^1H$ NMR analysis, as presented in example 1.

According to a particular embodiment, the modified hyaluronic acid according to the invention may thus have the following structure (I):

[Chem 2]

(I)

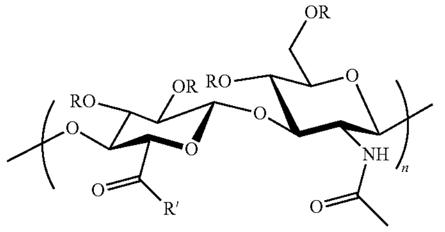

in which:

n represents the degree of polymerization of the hyaluronic acid, in other words the number of repeat units of disaccharide; in particular n is between 45 and 2500, and more particularly between 90 and 700;

the groups R represent, independently of one another, a hydrogen atom (unsubstituted hydroxyl function) or a group —$SO_3^-C^+$, $C^+$ being as defined above, and the groups R may be different from one repeat unit to another, provided that at least some of the groups R represent —$SO_3^-C^+$ groups;

the groups R', which may be identical or different from one repeat unit to another, represent a group $O^-C^+$ (unsubstituted carboxylic acid function), $C^+$ being as defined above; a group bearing an aromatic ring, benzene ring in particular, or else a separate group of the aforementioned groups, provided that at least some of the groups R' represent groups bearing an aromatic ring, a benzene ring in particular.

The other grafts R', separate from the groups bearing an aromatic ring, may be groups bearing other functions of interest, in particular crosslinkable functions, as detailed more particularly hereunder.

Preferably, the degree of sulfation, DSs, of the hyaluronic acid polymer of formula (I) is between 1 and 4, in particular between 2 and 4, preferably between 3 and 4 and more preferably of 4.

Preferably, the degree of substitution, $DS_{Ar}$, with said groups bearing an aromatic ring is between 0.05 and 0.5, in particular between 0.10 and 0.40 and more particularly between 0.15 and 0.3.

Preparation of a Modified Hyaluronic Acid According to the Invention

The invention further relates to a method for preparing a modified hyaluronic acid polymer according to the invention by grafting, on a hyaluronic acid chain, of groups having $SO_3^-$ functions and/or aromatic rings.

More particularly, a modified hyaluronic acid polymer according to the invention may be prepared from a hyaluronic acid via at least the following steps:

(i) grafting of —$SO_3^-C^+$ groups at the level of at least some of the hydroxyl functions of the hyaluronic acid; and (ii) grafting of groups bearing at least one, in particular of an aromatic ring, for example of a benzene ring, at the level of at least some of the carboxylic acid functions of hyaluronic acid;

the grafting steps (i) and (ii) may be carried out in this order or in the reverse order, preferably in this order ((i) and then (ii)).

It is within the competence of a person skilled in the art to use suitable coupling routes for proceeding to the grafting of the groups at the level of the hyaluronic acid chain, in particular with the desired degrees of substitution.

Methods for carrying out the sulfation of hyaluronic acid have for example been described in the literature ([24]-[29]).

According to a particular route of synthesis, the grafting in step (i) of —$SO_3^-C^+$ groups at the level of the hydroxyl functions of the hyaluronic acid proceeds by the following steps:

modification of the carboxylic acid functions of hyaluronic acid in the salified form to permit solubility of the salt of hyaluronic acid in the solvent medium used for the sulfation reaction, for example in the form of a tetrabutylammonium hyaluronate salt;

sulfation, in the solvent medium, of at least some of the hydroxyl functions of the hyaluronic acid, and purification to obtain the sulfated hyaluronic acid.

As described in the examples given hereunder, the sulfation reaction may for example be achieved by reacting hyaluronic acid with sulfur trioxide dimethylformamide ($SO_3DMF$) in dimethylformamide (DMF). A person skilled in the art is able to adjust the operating conditions, in particular in terms of contents of hyaluronic acid and $SO_3DMF$, duration and temperature, to carry out sulfation and obtain the desired degree of sulfation.

As stated above, the grafting in step (ii) of groups bearing at least one aromatic ring, for example a benzene ring, at the level of at least some of the carboxylic acid functions of hyaluronic acid, may more particularly be carried out by grafting a molecule comprising at least one aromatic ring and bearing at least one function able to react with a carboxylic acid function of a hyaluronic acid unit to form a covalent bond.

It may be for example a molecule bearing an amine function able to react with a carboxylic acid function of a hyaluronic acid unit to form an amide bond.

As an example, as illustrated in example 1 given hereunder, the groups bearing a benzene ring may result from the grafting of aminophenylboronic acid (designated PBA) with a carboxylic acid function of a disaccharide unit of hyaluronic acid.

A person skilled in the art is able to adjust the operating conditions to lead to the grafting of said molecule. For example, as illustrated in the examples, the coupling reaction between an amine function carried by the molecule possessing at least one aromatic ring and a carboxylic acid function of the hyaluronic acid may be carried out in a solvent medium, in the presence of a coupling agent such as DMTMM (4-(4,6-dimethoxy-1,3,5-triazin-2-yl)-4-methylmorpholinium chloride).

Modified Hyaluronic Acid Bearing Crosslinkable Functions

According to a variant embodiment, the modified hyaluronic acid according to the invention may in addition be functionalized with crosslinkable functions.

"Crosslinkable function" means a chemical group carried by the chain of the modified hyaluronic acid polymer that is able to allow, in suitable conditions, for example in the presence of a crosslinking agent, the establishment of bonds between the chains of hyaluronic acid, and the formation of a crosslinked network.

The crosslinkable functions carried by a modified hyaluronic acid polymer according to the invention may be of various kinds, provided that they are able to lead to the formation of a crosslinked network (or crosslinked matrix), in particular allowing production of a hydrogel starting from an aqueous solution or suspension comprising at least one such modified hyaluronic acid polymer according to the invention, as described more precisely hereunder.

Thus, they may be functions allowing crosslinking involving physical bonds ("physical crosslinking") or chemical bonds ("chemical crosslinking"). Physical crosslinking consists of the establishment of physical bonds (hydrogen, van der Waals, dipole-dipole, etc.) between the polymer chains, for example via polar functions (alcohols, acids, amines, ethers, esters, etc.). Chemical crosslinking consists of the establishment of covalent chemical bonds or dynamic (reversible) covalent bonds between the polymer chains.

More particularly, a crosslinkable function may be a reactive function X that is able to react with another reactive function Y, to form a physical or chemical bond, preferably a covalent chemical bond, where the reactive functions X and Y may be identical or different depending on the reaction employed for crosslinking.

The functions Y, when they are different than the functions X, may be carried by a modified hyaluronic acid polymer different than the modified hyaluronic acid polymer according to the invention bearing functions X.

Alternatively, crosslinking may carried out in the presence of a crosslinking agent comprising at least two functions Y, in particular from 2 to 4 functions Y, and more particularly two functions Y (bifunctionalized crosslinking agent).

As described more precisely hereunder, the crosslinking agent may be an organic molecule of variable size, bearing at least two functions Y available for reacting with reactive functions X. They may be organic molecules of low molecular weight, or oligomers, or chemically modified polymers.

The functions X and Y, identical or different, and reactive with respect to one another, may be of various kinds, depending on the reaction employed for crosslinking.

The crosslinkable functions may in particular be selected to allow crosslinking of the chains of hyaluronic acid via various physical of chemical routes, already proposed in the context of hydrogel preparation ([35]).

Among the functions able to establish so-called physical interactions, we may mention for example the dopamine functions; protons and electronegative atoms able to interact with one another to form hydrogen bonds; adamantyl functions able to interact with cyclodextrin units according to so-called "host-guest" chemistry ([36]); cations and anions able to interact with one another to form ionic bonds.

Preferably, the crosslinkable functions are functions allowing crosslinking by establishment of covalent chemical bonds (whether or not dynamic).

The crosslinkable functions may in particular be selected to allow crosslinking of the chains of hyaluronic acid via chemical routes, already proposed in the context of the preparation of hydrogels based on hyaluronic acid ([37]), for example such as by radical polymerization, by formation of carbon-nitrogen double bonds, by an addition reaction of the Michael type, by so-called "thiol-ene" photochemical reaction, by various types of so-called "orthogonal" chemistry, for example by Diels-Alder reaction, by Huisgen cycloaddition reaction, between a azide and an alkyne catalyzed by copper (I) or between a azide and a strained cycloalkynyl in the absence of copper catalyst, by an enzyme-catalyzed reaction, etc.

The crosslinkable functions may thus be for example:

- double bonds able to allow crosslinking of the chains of hyaluronic acid for preparing a hydrogel according to the invention by radical polymerization;
- aldehyde or ketone functions; or amine functions, in particular hydroxylamine or hydrazine functions, said aldehyde or ketone and amine functions being able to react with one another to form imine bonds, in particular oxime or hydrazone bonds;
- functions able to react with another function in the context of a Michael addition reaction, for example thiol functions (—SH), methacrylate or acrylate functions;
- functions with ethylenic unsaturation(s) (alkene functions), in particular ethenyl functions, or thiol functions, said functions being able to react with one another, in particular under photo-irradiation in the presence of a photoinitiator (so-called "thiol-ene" chemistry), to form a covalent bond, as described more precisely hereunder;
- conjugated diene functions, for example furan functions, or dienophile functions (alkenes) depleted of electrons, for example maleimide, said functions being able to react with one another, in particular by thermal activation, according to a Diels-Alder reaction to establish dynamic covalent bonds;
- azide functions, for example tetrazine functions; or alkyne functions, in particular strained cycloalkyne, said functions being able to react with one another according to a Huisgen cycloaddition reaction;
- tyramine functions able to dimerize by oxidation catalyzed by $H_2O_2$ and horseradish peroxidase (HRP), for example as described in the publication [38];
- boronic acid functions or vicinal plane diol functions, said functions being able to react with one another to form a dynamic covalent bond of the boronate ester type.

According to a particular embodiment, the modified hyaluronic acid polymer according to the invention bears at least one alkene function, in particular ethenyl, able to react with a function Y of the thiol type to form a covalent bond.

As an example, said modified hyaluronic acid polymer according to the invention may bear reactive functions X that are crosslinkable in the presence of a crosslinking agent bearing at least two functions Y, where:

- function X is an alkene function, for example ethenyl; and function Y is a thiol function, said functions X and Y reacting with one another according to a "thiol-ene" reaction, in particular by activation under UV radiation (photo-activatable reaction) in the presence of a photoinitiator;
- function X is a ketone function and function Y is an amine function, in particular hydroxylamine or hydrazine, said functions X and Y reacting with one another to form an imine bond, in particular an oxime or hydrazone bond;
- function X is a boronic acid function and function Y is a vicinal plane diol function, said functions X and Y reacting with one another to form a dynamic covalent bond of the boronate ester type;
- function X is a conjugated diene function and function Y is an alkene function, said functions X and Y reacting with one another according to a Diels Alder reaction, in particular by activation by heat (thermally activatable reaction), to form a dynamic covalent bond.

According to a particular embodiment, the modified hyaluronic acid polymer according to the invention may bear alkene functions, in particular ethenyl functions.

In this case, the crosslinking agent used for crosslinking the modified hyaluronic acid according to the invention, as described more precisely hereunder for the crosslinking of an ink according to the invention, may be an organic molecule having at least two functions, in particular two thiol functions.

According to a particular embodiment, a modified hyaluronic acid polymer according to the invention may have an average number of grafted crosslinkable functions, in particular of reactive functions X as described above, per repeat unit of the hyaluronic acid, between 0.05 and 0.50, in particular between 0.07 and 0.50 and more particularly between 0.10 and 0.50.

The average number of crosslinkable functions grafted on the modified hyaluronic acid can be determined by techniques known by a person skilled in the art, for example by $^1H$ NMR analysis.

Advantageously, by varying the average number of crosslinkable functions grafted at the level of the modified hyaluronic acid polymer according to the invention it is possible to modulate the mechanical properties of the hydrogel prepared from the modified hyaluronic acid according to the invention, as a function of the intended applications for this hydrogel.

A crosslinkable function may be carried by said group or groups bearing one or more $—SO_3^-$ functions and/or one or more aromatic rings, in particular by at least some of the groups bearing at least one aromatic ring; and/or may be carried by groups different than the group or groups bearing $—SO_3^-$ function(s) and/or aromatic ring(s).

According to a first variant embodiment, the crosslinkable functions are carried by at least some of the groups bearing at least one aromatic ring, for example a benzene ring, as described above, grafted on the modified hyaluronic acid according to the invention, in particular at the level of at least some of the carboxylic acid functions of the hyaluronic acid.

In other words, the modified hyaluronic acid according to the invention may have groups, grafted at the level of at least some of the carboxylic acid functions of the hyaluronic acid chain, bearing at least one aromatic ring, for example a benzene ring, and at least one crosslinkable function, in particular a reactive function X as defined above.

These groups may more particularly result from the grafting of a molecule comprising at least one aromatic ring, for example a benzene ring, at least one function able to react with the carboxylic acid function of a hyaluronic acid unit to form a covalent bond, for example an amide bond, and at least one crosslinkable function, in particular a reactive function X as defined above.

It may be for example a molecule of the following formula (II-a):

[Chem 3]

F-Ar-E-$R_1$ (II-a)

in which:

- F represents a function able to react with the carboxylic acid function of a hyaluronic acid unit to form a covalent bond, for example an amine function (—$NH_2$);
- Ar represents an aromatic ring, benzene in particular;
- E represents a hydrophilic organic spacer, for example a linear or branched aliphatic chain, optionally interrupted by one or more heteroatoms, in particular selected from O and N, and/or by one or more oxo groups (C═O);
- $R_1$ represents a crosslinkable function, for example a reactive function X as defined above, in particular an alkene function such as an ethenyl function.

The chain length of the spacer E depends on the nature of this spacer. More particularly, it is adjusted to allow good availability and reactivity of the crosslinkable function, in particular of the reactive function X, when the modified hyaluronic acid polymer according to the invention is put in the presence of a crosslinking agent as described above, but without being detrimental to the solubility of the modified hyaluronic acid according to the invention in an aqueous medium.

The spacer E may for example comprise, or be formed from, a chain of the oligo(ethylene glycol) or poly(ethylene glycol) type, or else of the oligo(ethylene imine) or poly (ethylene imine) type. Said oligo(ethylene glycol) or poly (ethylene glycol), oligo(ethylene imine) or poly(ethylene imine) chains may in particular have a number of ethylene oxide units (or of ethyleneimine units) from 2 to 20.

The spacer E may further comprise, or be formed from, an oligopeptide consisting of hydrophilic amino acids, for example such as glycine, serine, etc.

Of course, the nature of said spacer E is not in any way limited to the aforementioned examples, and other spacers may be envisaged.

According to a particular embodiment, the grafts bearing at least one aromatic ring and a crosslinkable function may for example result from the grafting of a molecule of the following formula (II'-a):

[Chem 4]

(II'-a)

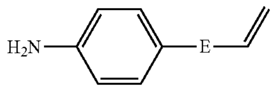

E being as defined above.

As an example, as illustrated in example 4, a group bearing at least one aromatic ring and at least one crosslinkable function may result from the grafting of 4-[(pent-4-en-1-yloxy)methyl]aniline.

According to another variant embodiment, the crosslinkable functions may be carried by grafts different than the group or groups bearing —$SO_3^-$ function(s) and/or aromatic ring(s).

In the context of this variant, the modified hyaluronic acid according to the invention may thus comprise, in addition to the groups described above, in particular $SO_3^-C^+$ groups and groups bearing at least one aromatic ring, for example a benzene ring, and groups bearing at least one crosslinkable function, in particular a reactive function X as defined above.

A group bearing at least one crosslinkable function may advantageously be grafted at the level of a carboxylic acid function of the hyaluronic acid, for example via an amide bond.

It may thus result from the grafting of an organic molecule, bearing at least one function, for example an amine function able to react with the carboxylic acid function of a hyaluronic acid unit to form a covalent bond, and at least one crosslinkable function, in particular a reactive function X as defined above.

It may be for example a molecule of the following formula (II-b):

[Chem 5]

F-E-$R_1$ (II-b)

in which:

- F represents a function able to react with the carboxylic acid function of a hyaluronic acid unit to form a covalent bond, for example an amine function (—$NH_2$);
- E represents an organic spacer, for example as defined for the molecules of formula (II-a);
- $R_1$ represents a crosslinkable function, for example a reactive function X as defined above, in particular a function with ethylenic unsaturation(s) such as an ethenyl function.
- E may for example comprise an oligo(alkylene glycol) or poly(alkylene glycol) (PAG) chain formed from 2 to 20 units of alkylene oxides, for example of ethylene oxide and/or of propylene oxide, for example an oligo(ethylene glycol) or poly(ethylene glycol) (PEG) chain.

The grafts bearing at least one crosslinkable function may for example result from the grafting of a molecule of the following formula (II'-b):

[Chem 6]

(II'-b)

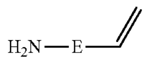

with E being as defined above.

As an example, as illustrated in example 3, a group bearing a crosslinkable function may result from the grafting of a molecule of the following formula

[Chem 7]

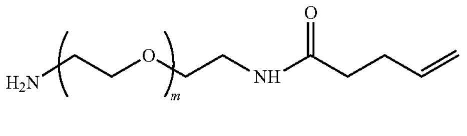

with m being an integer between 2 and 20, for example 11.

According to a particular embodiment, the degree of substitution of the carboxylic acid functions of a modified hyaluronic acid according to the invention with groups bearing a crosslinkable function, in particular a reactive function X as defined above, may be between 0.05 and 0.5, in particular between 0.07 and 0.5 and more particularly between 0.1 and 0.5.

As mentioned above, a person skilled in the art is able to apply suitable coupling routes for grafting the desired groups at the level of the hyaluronic acid, in particular with the desired degree of substitution.

Advantageously, when the crosslinkable functions are carried by groups different than the grafts having aromatic rings, grafting of the groups bearing at least one crosslinkable function and grafting of the groups bearing at least one aromatic ring employ identical coupling reactions.

For example, the grafts may be obtained from organic molecules possessing at least one aromatic group and from organic molecules possessing at least one crosslinkable function, as described above, these molecules further comprising at least one and the same function, for example an amine function able to react with a carboxylic acid function of the hyaluronic acid to form a covalent bond.

It is thus possible to proceed simultaneously with the grafting, in particular at the level of the carboxylic acid functions of hyaluronic acid, of the groups bearing at least one aromatic ring, for example a benzene ring, and of the groups bearing at least one crosslinkable function.

It is to be understood that the various embodiments mentioned above, in particular in terms of the nature of the groups grafted at the level of the modified hyaluronic acid according to the invention, may be combined, as far as possible.

Thus, according to a particular embodiment, a modified hyaluronic acid polymer according to the invention may be of formula (I) as defined above, in which:

- n represents the degree of polymerization of the hyaluronic acid, in other words the number of disaccharide repeat units, in particular n is between 45 and 2500, and more particularly between 90 and 700;
- the groups R represent, independently of one another, a hydrogen atom or a group —$SO_3^-C^+$, with $C^+$ representing a counterion of the —$SO_3^-$ anion, for example selected from the alkali and alkaline-earth cations, for example $Na^+$, and the groups R may be different from one repeat unit to another, provided that at least some of the groups R represent —$SO_3^-C^+$ groups;
- the groups R', which may be identical or different from one repeat unit to another, are selected from:
  - a group $O^-C^+$, $C^+$ being as defined above;
  - a group bearing an aromatic ring, in particular a benzene ring, and optionally at least one crosslinkable function, in particular a reactive function X as defined above; and
  - a group bearing at least one crosslinkable function, in particular a reactive function X as defined above;

provided that at least some of the groups R' represent groups bearing an aromatic ring, benzene in particular.

In particular, the modified hyaluronic acid polymer according to the invention may be of formula (I), in which the degree of sulfation, $DS_S$, is between 1 and 4, in particular between 2 and 4, preferably between 3 and 4 and more preferably of 4.

In particular, the modified hyaluronic acid polymer according to the invention may be of formula (I), in which the degree of substitution, $DS_{Ar}$, of the carboxylic acid functions with groups bearing an aromatic ring is between 0.05 and 0.50, in particular between 0.10 and 0.40 and more particularly between 0.15 and 0.30.

According to a particular embodiment, the modified hyaluronic acid polymer according to the invention may be of formula (I), in which the degree of substitution of the carboxylic acid functions with groups bearing at least one crosslinkable function may be between 0.05 and 0.50, in particular between 0.07 and 0.50 and more particularly between 0.10 and 0.50. Examples of modified hyaluronic acid according to the invention, and of the synthesis thereof, are presented in the examples given hereunder.

Ink and Materials Based on PEDOT and/or PProDOT, Doped with a Modified Hyaluronic Acid As mentioned above, a modified hyaluronic acid polymer according to the invention, as described above, may advantageously be used as polyelectrolyte for doping polymers of the polydioxythiophene type obtained from one or more monomers selected from EDOT (3,4-ethylenedioxythiophene), ProDOT (3,4-propylenedioxythiophene), and derivatives thereof.

As stated above, the homopolymers and copolymers of monomers selected from EDOT, ProDOT and derivatives thereof are designated more simply according to the invention with the term "PEDOT and/or PProDOT polymers".

A modified hyaluronic acid polymer according to the invention may more particularly be used as polyelectrolyte for doping polymers of the PEDOT type.

"Polymers of the PEDOT type" (or of the PProDOT type respectively) according to the invention denotes the homopolymers and copolymers of monomers selected from EDOT (or ProDOT), and derivatives thereof.

Similarly, "monomers of the EDOT type" (or of the ProDOT type) denotes EDOT (or ProDOT) and derivatives thereof.

"Copolymer" means a polymer obtained from at least two different monomers.

"Derivatives" of EDOT (or of ProDOT) denotes the compounds having the structure of EDOT (or of ProDOT), functionalized on at least the 1st or the 2nd carbon atom adjacent to the oxygen atoms, for example with a substituent bearing one or more functions selected from carboxylic acid (—COOH), hydroxyl (—OH), amine, thiol (—SH), ethenyl (—CH═$CH_2$), azide (—$N_3$), and sulfonate (—$SO_3$—) functions or at least one succinimide group, or with an exomethylene group (═$CH_2$).

Advantageously, the derivative of EDOT or of ProDOT is functionalized with a hydrophilic group, making it possible to improve the water solubility of the polymer of the PEDOT and/or PProDOT type.

The EDOT or ProDOT derivatives may more particularly be functionalized with at least one aliphatic group, in particular having from 1 to 100 carbon atoms, optionally interrupted by one or more oxygen atoms, nitrogen atoms and/or one or more ester function(s) (—O—C(O)—), and bearing at least one function selected from the hydroxyl (—OH), carboxylic acid (—COOH), thiol (—SH), amine, ethenyl ($—CH{=}CH_2$), azide ($—N_3$), and sulfonate ($—SO_3—$) functions or a succinimide group (designated-NHS).

In particular, the EDOT or ProDOT derivative may be functionalized with a group comprising an oligo(ethylene glycol) or poly(ethylene glycol) chain.

Derivatives of EDOT or ProDOT have already been described in the literature. For example, it may be an EDOT functionalized with a carboxylic acid group ("carboxy-EDOT", as described for example in the publication [39]); with a group bearing a sulfonate group, for example an alkoxy-sulfonate group, for example methoxybutane-1-sulfonate ("EDOT-S", as described for example in the publications and [41]); with a group bearing a thiol function, for example a group $—CH_2—O—(CH_2)_3—SH$ (as described in publication [42]); with groups comprising a polyethylene glycol chain, for example of the type $—CH_2$-$EG_n$-OH, with $EG_n$ representing a chain formed from 1 to 20 ethylene glycol units (for example as described in publication [43]); with a group $—CH_2—OH$ ("EDOT-OH"), $—CH_2—O—CH_2—COOH$ ("$C_2$-EDOT-COOH"), $—CH_2—O—C(O)—(CH)_2—COOH$ ("$C_4$-EDOT-COOH"), $—CH_2—O—CH_2—C(O)—O—NHS$ ("$C_2$-EDOT-NHS") or $—CH_2—O—CH_2—(CH_2—O—CH_2)_3—CH_2—N_3$ ("EDOT-$N_3$"), as described in publication [44]; with a group of the sulfobetaine type ("EDOT-SB" as described in publication [45]; with an exomethylene group ("emEDOT", as described in publication [46]).

As examples of derivatives of ProDOT, we may mention a ProDOT functionalized on the carbon atom in beta position of the oxygen atoms, with two alkenyl groups, for example allyls ("ProDOT-diene"), and the derivatives resulting from the reaction of "ProDOT-diene" with compounds bearing a terminal thiol function (R-SH), as described in publication [47].

Thus, the PEDOT and/or PProDOT polymers according to the invention are more particularly homopolymers and copolymers formed from one or more monomers selected from the monomers of the EDOT type of the following formula (M1) and the monomers of the ProDOT type of the following formula (M2):

[Chem 8]

(M1)

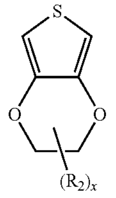

in which x has a value of 0 (in the case of EDOT) or x is an integer between 1 and 4, in particular x has a value of 1 (a single substitution); and $R_2$, identical or different, are selected from the substituents as described above, particularly groups bearing at least one carboxylic acid or ethenyl function, and preferably a carboxylic acid function;

[Chem 9]

(M2)

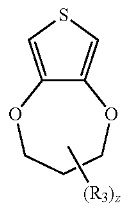

in which z has a value of 0 (in the case of ProDOT), 1 or 2, preferably z has a value of 0 or 2; and $R_3$, identical or different, in particular identical, are selected from the substituents as described above, in particular groups bearing at least one carboxylic acid or ethenyl function, and preferably a carboxylic acid function.

In particular, said substituent or substituents $R_3$ may be in beta position of the oxygen atoms.

According to a particular embodiment, the modified hyaluronic acid according to the invention is used for doping a (co) polymer of the PEDOT type, in particular formed from one or more monomers of the EDOT type with the aforementioned formula (M1).

According to another particular embodiment, the modified hyaluronic acid according to the invention is used for doping a (co) polymer of the PProDOT type, in particular formed from one or more monomers of the ProDOT type with the aforementioned formula (M2).

According to yet another particular embodiment, the modified hyaluronic acid according to the invention is used for doping a copolymer of the PEDOT-PProDOT type, in particular formed from one or more monomers of the EDOT type with the aforementioned formula (M1) and one or more monomers of the ProDOT type with the aforementioned formula (M2).

In general, the combination of a modified hyaluronic acid according to the invention with a PEDOT and/or PProDOT polymer may be obtained by polymerization of EDOT and/or ProDOT monomers, in the presence of a modified hyaluronic acid polymer according to the invention, as described above.

More particularly, the combination of a modified hyaluronic acid according to the invention with a PEDOT and/or PProDOT polymer may be obtained by oxidative polymerization of EDOT and/or ProDOT monomers, in an aqueous medium comprising at least one modified hyaluronic acid polymer according to the invention.

In particular, polymerization may be carried out in a solution of at least one modified hyaluronic acid polymer according to the invention in an aqueous medium. An aqueous suspension of PEDOT/PProDOT:modified HA according to the invention is then obtained.

As described hereunder, according to another variant embodiment, polymerization may be carried out in a hydrogel swollen in an aqueous medium based on modified hyaluronic acid according to the invention that is already crosslinked, or in an aqueous suspension, simultaneously with the crosslinking of the modified hyaluronic acid polymer according to the invention. A hydrogel based on PEDOT/PProDOT:modified HA according to the invention is then obtained.

Ink

According to one of its aspects, the invention thus relates to an aqueous suspension comprising at least one PEDOT and/or PProDOT polymer combined with at least one modified hyaluronic acid according to the invention. An aqueous suspension of this kind is more commonly designated as "ink".

According to another of its aspects, the invention further relates to a method for preparing an ink according to the invention, in which EDOT and/or ProDOT monomers are polymerized in a solution comprising at least one modified hyaluronic acid polymer according to the invention in an aqueous medium.

A person skilled in the art is able to adjust the operating conditions for preparing an ink according to the invention. Polymerization of the EDOT and/or ProDOT monomers may for example be carried out in the presence of an oxidant, for example iron sulfate ($Fe^{3+}$), and catalyzed by persulfate, as described for the synthesis of poly(3,4-ethylenedioxythiophene):dextran sulfate (PEDOT:DS) by Harman et al. ([23]).

The aqueous medium may be formed for example from a mixture of water and one or more organic solvents, for example a mixture of water and acetonitrile.

Without wanting to be bound by a theory, as represented schematically in FIG. 1 in the case of using EDOT monomers, the EDOT and/or ProDOT monomers will be bound to the chain of modified hyaluronic acid according to the invention by weak interactions of the electrostatic type, hydrophobic interactions and "π-π stacking" interactions, the polymer of the PEDOT and/or PProDOT type obtained at the end of the polymerization thus being bound to the modified hyaluronic acid by these weak interactions.

According to a particular embodiment, said EDOT and/or ProDOT monomers and said modified hyaluronic acid polymer or polymers according to the invention are used in a molar ratio between the EDOT and/or ProDOT monomers and the units of modified hyaluronic acid of between 0.5 and 5, in particular between 1 and 4, more particularly between 1.5 and 4.

An ink according to the invention may comprise a content by weight of PEDOT/PProDOT:modified HA, in particular of PEDOT:modified HA, between 1 and 6 wt % (10 to 60 g/L), in particular between 2 and 6 wt % (20 to 60 g/L) and more particularly between 3 and 4.5 wt % (30 to 45 g/L).

It is possible to lyophilize an ink according to the invention.

The lyophilized ink may then be redispersed in a solvent, for example an aqueous solvent, to be used for example for forming hydrogels as described hereunder.

According to a particular embodiment, the ink comprises at least one PEDOT and/or PProDOT polymer, in particular of the PEDOT type, doped with a modified hyaluronic acid according to the invention, bearing crosslinkable functions, in particular reactive functions X as defined above, for example functions with ethylenic unsaturation(s) such as ethenyl functions. In the context of this embodiment, the ink according to the invention is advantageously crosslinkable. It may thus be used for forming hydrogels as detailed hereunder.

Materials Based on PEDOT/PProDOT:Modified HA

As mentioned above, the invention further relates to materials based on at least one PEDOT and/or PProDOT polymer, in particular as defined above, doped with at least one modified hyaluronic acid polymer according to the invention.

It relates more particularly to a hydrogel based on at least one PEDOT and/or PProDOT polymer, in particular as defined above, in particular of the PEDOT type, doped with at least one modified hyaluronic acid polymer, bearing crosslinkable functions as defined above and/or having free carboxylic acid functions.

A hydrogel is formed from a three-dimensional network based on polymers. In the context of a hydrogel swollen in an aqueous medium, the polymer network is swelled by an aqueous liquid phase. In particular, a hydrogel swollen in an aqueous medium (also called wet hydrogel) may comprise a content by weight of aqueous liquid phase from 5 to 99 wt %, in particular from 10 to 99 wt % and more particularly from 20 to 99 wt %.

A so-called "dry" hydrogel results from the removal of the aqueous liquid phase from a wet hydrogel. A dry hydrogel may more particularly comprise less than 20 wt %, in particular less than 10 wt %, of liquid phase.

Several variants may be employed for forming a hydrogel based on PEDOT/PProDOT:modified HA according to the invention, in particular based on PEDOT:modified HA.

According to a first variant embodiment, a hydrogel according to the invention may be prepared from a crosslinkable ink according to the invention, as described above, based on PEDOT and/or PProDOT polymer(s), in particular of the PEDOT type, doped with at least one modified hyaluronic acid according to the invention and bearing crosslinkable functions and/or having free carboxylic acid functions, preferably bearing crosslinkable functions.

A hydrogel based on PEDOT/PProDOT:modified HA according to the invention, in particular based on PEDOT:modified HA, may thus be obtained by carrying out the crosslinking of an ink according to the invention.

More particularly, according to a first variant embodiment, a hydrogel based on PEDOT/PProDOT:modified HA according to the invention, in particular based on PEDOT:modified HA, may be prepared by at least the steps consisting of:

(a-i) providing a crosslinkable ink, comprising at least one PEDOT and/or PProDOT polymer, in particular of the PEDOT type, doped with at least one modified hyaluronic acid polymer according to the invention and bearing crosslinkable functions and/or having free carboxylic acid functions, preferably bearing crosslinkable functions;

(a-ii) submitting said ink to conditions that are favorable for the crosslinking of said chains of modified hyaluronic acid to form a hydrogel swollen in an aqueous medium; and, optionally, (a-iii) submitting said hydrogel swollen in an aqueous medium to a drying step for obtaining a dry hydrogel.

According to another variant embodiment, as mentioned above, a hydrogel according to the invention may be prepared by polymerization of EDOT and/or ProDOT monomers, in particular of the EDOT type, in a hydrogel formed beforehand from at least one modified hyaluronic acid polymer and bearing crosslinkable functions according to the invention and/or having free carboxylic acid functions, preferably bearing crosslinkable functions.

More particularly, according to a second variant embodiment, a hydrogel based on PEDOT/PProDOT:modified HA according to the invention, in particular based on PEDOT: modified HA, may be prepared by at least the steps consisting of:

(b-i) providing a hydrogel, swollen in aqueous medium, formed from at least one modified hyaluronic acid polymer according to the invention and bearing crosslinkable functions and/or having free carboxylic acid functions, preferably bearing crosslinkable functions;

(b-ii) carrying out the polymerization of EDOT and/or ProDOT monomers, in particular of the EDOT type, in said hydrogel, swollen in an aqueous medium, based on modified hyaluronic acid; and, optionally (b-iii) submitting said hydrogel obtained at the end of step (b-ii) to a drying step for obtaining a dry hydrogel.

The hydrogel based on at least one modified hyaluronic acid according to the invention, used in step (b-i) of the method of the invention, is more particularly obtained beforehand by subjecting a solution of at least one modified hyaluronic acid according to the invention and bearing at least crosslinkable functions and/or having free carboxylic acid functions, preferably bearing crosslinkable functions, in an aqueous medium, to conditions that are favorable for the crosslinking of said chains of modified hyaluronic acid to form a swollen hydrogel in said aqueous medium.

The aqueous medium may be as described above for an ink according to the invention. For example, it may be formed from a mixture of water and one or more organic solvents, for example a mixture of water and acetonitrile.

The polymerization in step (b-ii) of the EDOT and/or ProDOT monomers, in particular of the EDOT type, in a hydrogel based on modified hyaluronic acid, may more particularly be carried out by soaking the hydrogel swollen in an aqueous medium based on modified HA according to the invention, of said monomers of the EDOT and/or ProDOT type, in particular of the EDOT type, and then subjecting said hydrogel based on modified HA impregnated with said EDOT and/or ProDOT monomers, in particular of the EDOT type, to conditions that are favorable for the polymerization of said EDOT and/or ProDOT monomers, in particular of the EDOT type.

The hydrogel impregnated with at least said EDOT and/or ProDOT monomers may for example be obtained by the following intermediate steps:

starting from the hydrogel swollen in an aqueous medium based on modified hyaluronic acid, formation of a dry hydrogel, for example by putting the hydrogel in conditions favorable to the gelation of the aqueous medium, followed by removal of the aqueous medium by evaporation, by lyophilization or by supercritical drying; and immersing said dry hydrogel in a solution of at least one monomer of the EDOT and/or ProDOT type, in particular of the EDOT type, in an aqueous medium, for example in a mixture of water and acetonitrile; to obtain said hydrogel swollen in an aqueous medium and impregnated with said EDOT and/or ProDOT monomers, in particular of the EDOT type.

The polymerization in step (b-ii) of said EDOT and/or ProDOT monomers, in particular of the EDOT type, in the aqueous hydrogel may be carried out in conditions as described above for the polymerization, in aqueous solution, of the EDOT and/or ProDOT monomers, in the context of the preparation of an ink according to the invention. The polymerization of EDOT and/or ProDOT monomers, in particular of the EDOT type, in the aqueous hydrogel may for example be carried out in the presence of an oxidant, for example iron sulfate ($Fe^{3+}$), and catalyzed by persulfate. In this case, the hydrogel based on modified hyaluronic acid, once impregnated with said EDOT and/or ProDOT monomers, in particular of the EDOT type, may be immersed in an aqueous solution containing at least said oxidant and said catalyst.

The hydrogel obtained the end of step (b-ii) is thus based on PEDOT/PProDOT:modified HA, in particular based on PEDOT:modified HA.

In the context of any of the variants described above for preparing a hydrogel based on PEDOT/PProDOT:modified HA according to the invention, in particular based on PEDOT:modified HA, a person skilled in the art is able to apply suitable crosslinking conditions to give sufficient crosslinking of the chains of modified hyaluronic acid, to obtain a hydrogel (either to obtain, in step (a-ii), a hydrogel based on PEDOT/PProDOT:modified HA according to the first variant mentioned above, or to obtain a hydrogel based on modified HA used in step (b-i) according to the second variant mentioned above).

The conditions for crosslinking, in particular of a physical or chemical nature, depend of course on the nature of the crosslinkable functions carried by the modified hyaluronic acid.

As stated above, various routes of crosslinking are conceivable, provided that they make it possible to lead to the formation of a hydrogel.

Preferably, crosslinking involves the establishment of covalent chemical bonds between the chains of modified hyaluronic acid.

According to a particular embodiment, a hydrogel, according to any of the aforementioned variants, is formed from at least two different polymers of modified hyaluronic acid, said modified hyaluronic acid polymers according to the invention having different crosslinkable functions, designated X and Y, as described above.

In a particular embodiment, said crosslinkable functions X and Y may be able to react with one another to form a covalent bond.

As an example, the crosslinkable functions X and Y may be an aldehyde function or ketone function respectively, and an amine function such as a hydroxylamine or hydrazide function, said functions X and Y being able to react with one another to form imine bonds, in particular oxime or hydrazone bonds.

The crosslinkable functions X and Y may for example also be, respectively, a thiol function and a methacrylate or acrylate function, said functions X and Y being able to react with one another according to a Michael addition reaction.

The crosslinkable functions X and Y may for example also be, respectively, a vicinal plane diol function and a boronic acid function, for example phenylboronic, said functions X and Y being able to react with one another according to a reaction of dynamic covalent coupling.

Of course, the invention is not in any way limited to the aforementioned routes of crosslinking, and other routes of crosslinking may be envisaged, for example by means of crosslinkable functions able to establish physical interactions, as described above.

According to another particular embodiment, a hydrogel, according to any of the aforementioned variants, is formed from a single modified hyaluronic acid polymer according to the invention, bearing at least crosslinkable functions.

In a particular embodiment, said crosslinkable functions may react with one another, as is the case for example for tyramine functions, said chains of modified hyaluronic acid according to the invention then being able to self-crosslink by oxidative coupling (dimerization) of the tyramine functions in the presence of $H_2O_2$ and HRP.

In another particular embodiment, the crosslinkable functions of said modified hyaluronic acid polymer according to the invention may be reactive functions X, as defined above, crosslinkable in the presence of a crosslinking agent.

"Crosslinking agent" means an organic molecule bearing at least two reactive functions, said molecule being able to permit, for example under the action of an external stimulation, in particular under the action of heat and/or UV radiation, the crosslinking of said chains of modified hyaluronic acid according to the invention, by reaction with said crosslinkable functions of said modified hyaluronic acid.

It is within the competence of a person skilled in the art to select a suitable crosslinking agent to allow crosslinking of the polymer chains of modified hyaluronic acid according to the invention. The nature of the crosslinking agent is also likely to have an effect on the mechanical properties of the hydrogel formed at the end of the crosslinking.

Advantageously, the crosslinking agent is biocompatible, and hydrolyzable in physiological conditions.

When a polymer of hyaluronic acid bearing crosslinkable functions is used in the presence of at least one crosslinking agent, the solution or suspension from which the hydrogel is formed, for example the ink based on PEDOT/PProDOT: modified HA in step (a-i) according to the first variant of preparation of a hydrogel based on PEDOT/PProDOT:modified HA according to the invention, is supplemented with at least one crosslinking agent and, optionally, at least one photoinitiator compound.

As mentioned above, the modified hyaluronic acid according to the invention may be functionalized with reactive functions X as described above, in particular functions with ethylenic unsaturation(s), for example ethenyl functions.

In the context of this embodiment, the crosslinking agent may be an organic molecule possessing at least two reactive functions, in particular from two to four reactive functions, for example two reactive functions, designated Y, the functions X and Y being identical or different, each of the functions Y being able to react with a reactive function X of said modified hyaluronic acid polymer according to the invention, to form a physical or chemical bond, preferably a covalent chemical bond, in particular under the action of heat and/or UV radiation, and optionally in the presence of at least one photoinitiator compound.

The functions Y may be for example thiol functions (—SH) able to react with functions X of the alkene type, in particular ethylenes, carried by the modified hyaluronic acid according to the invention, to form covalent bonds ("thiol-ene" crosslinking).

According to a particular embodiment, the crosslinking agent used according to the invention may be of the following formula (III):

[Chem 10]

$$E'(—Y)_y \quad (III)$$

in which:

- y is an integer from 2 to 4, in particular y has a value of 2 (bifunctional crosslinking agent) or 3 (trifunctional crosslinking agent);
- Y, identical or different, preferably identical, are functions able to react, in particular under the action of heat or UV radiation, with a reactive function X, in particular of the alkene type, in particular ethylene, carried by the modified hyaluronic acid used according to the invention; in particular Y are thiol functions (—SH); and
- E' is a divalent, trivalent, or tetravalent organic spacer group.

The organic spacer group E' may be a linear or branched aliphatic group, in particular comprising from 2 to 1000 carbon atoms, and optionally comprising one or more unsaturations and/or one or more heteroatoms, and optionally substituted with one or more hydroxyl functions.

As examples of bifunctional crosslinking agent, we may mention molecules formed from an oligo or poly(alkylene glycol) (PAG) chain, for example oligo or poly(ethylene glycol), bearing thiol functions at each end (HS-PAG-HS). In particular, the PAG chain of the crosslinking agent may be formed from 2 to 250, in particular from 5 to 100, alkylene oxide, in particular ethylene oxide, units.

We may also mention, as crosslinking agents bearing from two to four thiol functions, dithiothreitol (DTT), trimethylolpropane tris(mercaptoacetate), pentaerythritol tetrakis (mercaptoacetate) or pentaerythritol tetrakis(3-mercaptopropionate).

Said molecule or molecules, employed as crosslinking agent, may be commercially available. Alternatively, they may be obtained prior to their application in a method according to the invention.

According to a particular embodiment, said crosslinking agent or agents are used in an amount such that the molar ratio between the functions Y of the crosslinking agent and the functions X of the modified hyaluronic acid is less than or equal to 1, in particular between 0.5 and 1 and preferably strictly less than 1.

Crosslinking may be activated by an external stimulus, for example by heat (thermally activated crosslinking) and/or under radiation (photo-activated crosslinking).

In the case when a photo-activatable crosslinking agent is used, said crosslinking agent may be used in the solution or suspension comprising at least said modified hyaluronic acid polymer according to the invention, starting from which a hydrogel is formed, for example in the ink based on PEDOT/PProDOT:modified HA of step (a-i) according to the first variant mentioned above, jointly with at least one photoinitiator compound.

As an example, "thiol-ene" crosslinking may be photo-activated in the presence of a photoinitiator, such as lithium phenyl-2,4,6-trimethylbenzoylphosphinate.

It is within the competence of a person skilled in the art to adjust the conditions of thermal or photo-crosslinking, in particular in terms of power and duration of heating or of irradiation with UV radiation, to obtain sufficient crosslinking to give the desired hydrogel.

Of course, the invention is not in any way limited to this particular manner of crosslinking by photo-activated "thiol-ene" chemistry. Thus, other routes of crosslinking may be employed, as mentioned above.

In another variant embodiment, the crosslinking of said chains of modified hyaluronic acid according to the invention may be carried out, in the absence of grafting of crosslinkable functions at the level of the chain of modified hyaluronic acid, on the basis of the free carboxylic acid functions of the modified hyaluronic acid according to the invention.

"Free carboxylic acid function" means a carboxylic acid function (—C(O)OH), optionally in the form of carboxylate salt —C(O)O—$C^+$ where $C^+$ represents a counterion, in particular selected from the alkali and alkaline-earth cations, for example $Na^+$.

In the context of this variant, the crosslinking of the chains of modified hyaluronic acid according to the invention may more particularly be carried out in the presence of a crosslinking agent having at least two functions of the primary amine or hydrazide type, in particular two functions of the primary amine or hydrazide type; said functions being able to interact with free carboxylic acid functions by a coupling reaction activated by means of an activating agent, to form amide bonds.

As an example of a crosslinking agent bearing two hydrazide functions, we may mention adipic acid dihydrazide (ADH), which is particularly advantageous on account of its biocompatibility.

The activating agent for activating the amide coupling reaction may be for example N-(3-dimethylaminopropyl)-N'-ethylcarbodiimide hydrochloride (EDC).

According to a third variant embodiment, a hydrogel according to the invention may be prepared by carrying out, simultaneously, the polymerization of the EDOT and/or ProDOT monomers, in particular of the EDOT type, and the crosslinking of said modified hyaluronic acid polymer bearing free carboxylic acid functions.

A person skilled in the art is able to adjust the operating conditions so that the conditions employed for the crosslinking of said modified hyaluronic acid polymer according to the invention are compatible with the polymerization conditions of the EDOT and/or ProDOT monomers.

More particularly, according to a third variant embodiment, a hydrogel based on PEDOT/PProDOT:modified HA according to the invention, in particular based on PEDOT:modified HA, may be prepared by at least the steps consisting of:

(c-i) providing an aqueous suspension comprising at least EDOT and/or ProDOT monomers, at least said modified hyaluronic acid polymer having free carboxylic acid functions, at least one catalyst of the polymerization of EDOT and/or ProDOT monomers, in particular persulfate; and at least one crosslinking agent;

(c-ii) subjecting said suspension to conditions that are favorable for the polymerization of said EDOT and/or ProDOT monomers and for the crosslinking of said chains of modified hyaluronic acid to form said hydrogel swollen in an aqueous medium; and optionally (c-iii) submitting said hydrogel obtained at the end of step (c-ii) to a drying step to obtain said dry hydrogel.

According to a particularly preferred embodiment, the crosslinking agent used has at least two functions of the primary amine or hydrazide type, in particular two functions of the primary amine or hydrazide type, preferably ADH.

The crosslinking of said chains in step (c-ii) may be initiated by adding an activating agent of the carboxylic acid functions, such as EDC, to said suspension.

In the context of this embodiment, the aqueous suspension used for simultaneously carrying out the polymerization of said EDOT and/or ProDOT monomers and the crosslinking of said chains of modified hyaluronic acid preferably has a low pH, for example less than or equal to 5.

According to a particular embodiment, formation of the hydrogel swollen in an aqueous medium based on PEDOT/PProDOT:modified HA according to the invention, according to any of the aforementioned variants, may be followed by at least one step of complete or partial drying, allowing the aqueous solvent medium present in the hydrogel to be removed at least partially.

Removal of the solvent medium is advantageously carried out in conditions making it possible to maintain the structure and the cohesion of the hydrogel obtained at the end of crosslinking. The hydrogel swollen in an aqueous medium may for example be dried at room temperature. "Room temperature" means a temperature of 20° C.±5° C.

The dry hydrogel formed, in particular in the form of film, is able to swell when it is brought into contact with an aqueous medium, to reform a hydrogel swollen in an aqueous medium.

The solution or suspension comprising at least said modified hyaluronic acid polymer according to the invention, from which a hydrogel is formed, for example the ink based on PEDOT/PProDOT:modified HA in step (a-i) according to the first variant mentioned above, may be formed, prior to the crosslinking step, to obtain a hydrogel having the desired shape and dimensions. The hydrogel based on PEDOT/PProDOT:modified HA according to the invention formed at the end of any of the method variants described above, optionally after drying, may thus be of varying shape and size, depending in particular on the application for which it is intended.

For example, the solution or suspension based on polymer(s) of modified hyaluronic acid according to the invention, for example the ink based on PEDOT/PProDOT:modified HA according to the invention, may be crosslinked in a container, or "mold", having the shape and the dimensions desired for the final hydrogel.

According to a particular embodiment, the hydrogel, swollen in an aqueous medium or dry, may be in the form of a film. The film may be formed on the surface of a substrate and then optionally separated from said substrate to form a self-supporting film of conductive hydrogel.

In the context of this embodiment, the suspension or solution in step (a-i), (b-i) or (c-i) based on polymer(s) of modified hyaluronic acid according to the invention, for example the ink based on PEDOT/PProDOT:modified HA according to the first variant mentioned above, may be applied, before crosslinking, on the surface of a substrate, advantageously on defined zones of the surface of a substrate, so as to create the pattern and the dimensions desired for the final film of conductive hydrogel.

The substrate refers to a solid base structure, on one of the faces of which the solution or suspension based on modified HA according to the invention, for example a conductive ink according to the invention, is deposited. It may be of varying shape and dimensions depending on the application for which it is intended. It may be for example in the form of a flat surface, structured or not, or else a 3D object, for example in the form of microstuds, gratings, fibers, etc.

The substrate may be of varying nature, rigid or flexible. It may be a ceramic support, for example of glass, alumina, porcelain; of metal, for example of stainless steel, copper, aluminum, or of plastic.

Advantageously, the method according to the invention may be used for rigid or flexible polymer supports.

For example, the support may be of PET (polyethylene terephthalate), PEN (polyethylene naphthalate), polycarbonate, poly(urethane), poly(saccharide) (cellulose, nanocellulose, chitosan films), protein material (collagen fibers, for example). The support may also be a 3D material structured in the form of microstuds, gratings, fibers, for example fibers obtained by electrospinning or others (poly(caprolactone), PVA (polyvinyl alcohol), silk fibroins, etc.), cellulose aerogels.

The hydrogel based on PEDOT/PProDOT:modified HA according to the invention, in particular based on PEDOT:modified HA, may for example be formed, in particular in the form of a film, directly on the surface of the substrate of interest, for example to form a surface coating of an electrode of a bioelectronic device.

The solution or suspension based on modified HA according to the invention, for example the ink based on PEDOT/PProDOT:modified HA according to the invention, in particular based on PEDOT:modified HA, may be applied by any technique known by a person skilled in the art. Application of the solution or suspension on the surface of the substrate may be carried out for example by coating, by inkjet printing, by spray-coating, by screen printing, by dipping etc.

The thickness of the deposit of the solution or suspension, in particular of the ink based on PEDOT/PProDOT:modified HA, in particular based on PEDOT:modified HA, on the surface of the substrate may be variable. For example, it may be between 0.1 and 500 μm, in particular between 1 and 300 μm.

Advantageously, the hydrogel, in particular in the form of a film, formed according to the invention on the surface of a substrate may be bound covalently (or "grafted") to the surface of the substrate.

In the context of this variant embodiment, the surface of the substrate, intended to support the hydrogel according to the invention, may have functions Y, in particular as described above, for example labile hydrogen functions such as thiol functions able to react with crosslinkable functions X, for example alkene functions, carried by the modified hyaluronic acid according to the invention.

The hydrogel film may thus be bound to the surface of the substrate by the establishment of covalent bonds between said crosslinkable functions X carried by the modified hyaluronic acid, and said functions Y present on the surface of the substrate intended to support the hydrogel.

The surface of the substrate intended to support the hydrogel according to the invention may be submitted to a preliminary treatment to generate said functions Y, in particular labile hydrogen functions, for example said thiol functions.

The crosslinking of the chains of modified hyaluronic acid, according to any of the method variants according to the invention for forming a hydrogel, leads simultaneously to the grafting of the chains of modified hyaluronic acid on the surface of the substrate.

Applications

As stated above, the ink and the materials, in particular the hydrogels, formed on the basis of PEDOT/PProDOT:modified HA according to the invention, in particular on the basis of PEDOT:modified HA, find particularly interesting applications in the biomedical field, in particular for the design of bioelectronic devices and biosensors intended to be brought into contact with biological material, for example intended to be implanted in vivo, for example for monitoring or stimulating biological tissues.

More particularly, the inks and materials, in particular hydrogels, formed according to the invention are advantageously employed in bioelectronic devices to serve as an interface with biological tissues, for example to supply a support for cell adhesion, multiplication and growth.

Advantageously, the ink and materials derived from ink are biocompatible (or cytocompatible).

"Biocompatible" means that the ink and the materials derived from ink, such as hydrogels, are able to be in contact with biological cells without degrading said cells.

They are also advantageously biodegradable.

"Biodegradable" means, in the sense of the present application, a material able to be resorbed, absorbed, and/or degraded by the tissues or leached from the implantation site, disappearing in vivo after a certain time, which may vary for example from some hours to some months.

The ink and the materials, in particular hydrogels, formed on the basis of PEDOT/PProDOT:modified HA according to the invention advantageously have good electrical conductivity, in particular in physiological conditions (pH 7.4 in aqueous medium), without requiring additional treatment or doping.

They may thus have conductivity greater than or equal to 0.1 S/cm, in particular greater than or equal to 1 S/cm.

The conductivity may be measured by methods known by a person skilled in the art. For example, as described in example 5 hereunder, the conductivity of a hydrogel film according to the invention may be deduced from measurement of the resistivity of the film, for example using a 4-point resistivity meter.

Advantageously, the hydrogels formed according to the invention on the basis of the complex of PEDOT and/or PProDOT polymer(s) doped with a modified hyaluronic acid according to the invention also have excellent stability in water or in a buffered saline medium.

Moreover, the hydrogels formed according to the invention have excellent mechanical performance, in particular good properties of viscoelasticity. They may have a high elastic modulus, also called Young's modulus. In particular, the elastic modulus may be between 100 Pa and 1 MPa, in particular between 300 Pa and 500 kPa.

The viscoelasticity properties of a hydrogel formed according to the invention can be studied by rheological measurements in dynamic mode (determination of the storage modulus (G') and loss modulus (G") as a function of frequency). Young's modulus can be determined by compression tests.

Owing to their excellent viscoelasticity properties, the hydrogels formed according to the invention are easily conformable, in particular conformable to biological tissues.

They may thus form interfaces for bioelectronic devices, for example implants conformable to biological tissues, in other words they may assume the shape or geometry of the biological tissue with which they are intended to come into contact. Their water-rich nature and their mechanical properties similar to those of biological tissues make the hydrogels according to the invention ideal interfaces with biological tissues for bioelectronic devices.

The materials according to the invention thus provide a narrow interface between the implant and the tissue site.

They may for example be used as a coating for implanted electrodes, for example intracranial electrodes, or for forming microelectrodes.

The invention will now be described by means of the following examples and figures, given of course for purposes of illustration, and not limiting the invention.

EXAMPLES

The following abbreviations are used in the examples given hereunder.

HA: hyaluronic acid; NaHA: sodium hyaluronate;

HA-TBA: tetrabutylammonium hyaluronate salt;

TBA: tetrabutylammonium;

HAS: sulfated hyaluronic acid;

PBS: phosphate-buffered saline.

Example 1

Preparation of a Modified Hyaluronic Acid According to the Invention Bearing Sulfate Groups and Grafts Comprising an Aromatic Ring ($HAS_4$-$PBA_{0.3}$)

1.1. Sulfation of Sodium Hyaluronate (NaHA)

In a first step, sulfation of NaHA is carried out by replacing the hydroxyl functions of the HA with sulfates.

The sulfation of HA is carried out according to a protocol adapted from the literature ([24]-[29]); it proceeds in three steps, as shown schematically hereunder: formation of the tetrabutylammonium hyaluronate salt (HA-TBA), sulfation reaction, and purification.

[Chem 11]

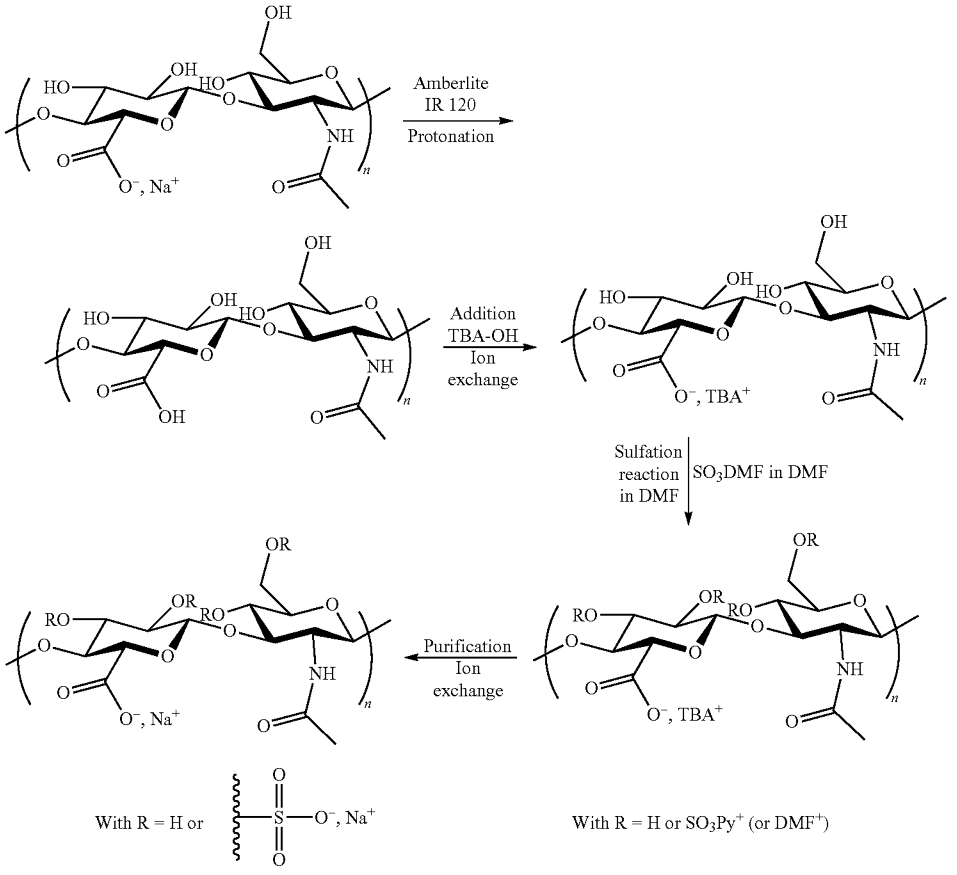

Formation of HA-TBA

Regeneration of Resin 50 g of Amberlite® IR-120 resin is put in a column (inside diameter 1.5 cm, height 25 cm), and rinsed with 300 mL of ultrapure water Milli Q 18.2 MΩ (called more simply "water" hereunder). A solution of sodium hydroxide (NaOH) at 0.4 M was eluted to basic pH. The water was eluted to neutral pH. A solution of hydrochloric acid (HCl) at 100 g/L was eluted to acid pH, then the column was blocked for 30 minutes. The HCl residue was eluted, and then the resin is washed by elution with water to neutral pH. Throughout the process, the resin was never dried, in order to avoid any air bubbles.

Formation of HA-TBA 1 g of NaHA was dissolved in 300 mL of water. The solution of NaHA was eluted through 50 g of neutralized Amberlite® IR-120 resin in the $H^+$ form, dropwise without application of pressure. The resin was rinsed with 100 ml of water. The final pH was verified as being about 2.7-2.9. 2 g of tetrabutylammonium hydroxide (TBA-OH) was diluted in 10 mL of water, and added dropwise to the solution of hyaluronic acid until the pH is close to 4.2-4.3. The solution of HA-TBA was then frozen in liquid nitrogen and lyophilized.

Analysis of the degree of substitution with TBA, $DS_{TBA}$, was performed by 1H NMR integration: integration of the signal at 1.99 ppm corresponding to the N-acetyl protons of HA is normalized to 3. The degree of substitution obtained $DS_{TBA}$, calculated as follows, is approx. 1.

$$DS_{TBA}=(\int Ha+\int Hb+\int Hc+\int Hd)/36 \quad \text{[Math 1]}$$

HA-TBA was obtained at a yield greater than 95%.

($^1H$ NMR ($D_2O$, 353 K): 4.68-4.36 (2H, dd), 4.25 (HDO peak), 3.95-3.25 (10H, m), 3.18-3.10 (8Ha, t), 2.10-1.84 (3H, s), 1.70-1.56 (8Hb, quint), 1.42-1.28 (8Hc, hex), 1.00-0.86 (12Hd, t)).

Sulfation Reaction 1 g of HA-TBA (1 equivalent) was suspended in 212 mL of dimethylformamide (DMF), and stirred for 5 minutes under nitrogen. The suspension was cooled to 4° C. and stirred under nitrogen for 1.5 h. During this time, 4.94 g of dimethylformamide-sulfur trioxide complex ($SO_3DMF$, 20 equivalents) was dissolved in 40 mL of DMF and degassed by bubbling with nitrogen for 5 minutes. The solution of $SO_3DMF$ was added immediately to the solution of HA-TBA. The reaction mixture was quickly purged with nitrogen, and then stirred for 1 hour at 4° C. under nitrogen.

Purification

After 1 hour, the reaction mixture was taken out of the refrigerator, and the reaction was stopped by adding 667 mL of NaOH solution at 50.8 mM (21 equivalents of OH ions); the pH of the solution was about 2.4-2.6. The pH of the solution was neutralized with 2M NaOH solution. 6 g of sodium chloride (NaCl) was dissolved in 70 mL of water and added to the reaction mixture to obtain a final concentration of NaCl of 0.5 M. The sulfated hyaluronic acid (HAS) was precipitated by slowly adding 1.7 L of EtOH while stirring vigorously. The mixture was stirred for 10 minutes, and then filtered with a P4 fritted glass filter. The white powder was collected and dissolved in 50 ml of water. 475 mL of EtOH was added slowly while stirring vigorously. The mixture was stirred for 10 minutes, and then filtered with a P4 fritted glass filter. The white powder was collected and dissolved in 50 ml of water. 643 mg of NaCl was dissolved in water and was added to the reaction mixture to obtain a final concentration of NaCl of 0.2 M. The medium was filtered with a 0.8 μm filter to remove the particles. The medium was dialyzed against water treated by osmosis with a 6 to 8 kDa membrane, changing the bath every 4 to 10 hours until the conductivity of the water is less than 8 μS/cm. The HAS solution was then lyophilized. HAS was obtained at a yield of about 60%.

Analysis

The degree of sulfation $DS_{sulfation}$ (also designated $DS_s$) of the sample is defined as the average sulfate number per repeat unit of hyaluronic acid. Since sulfate replaces the hydroxyl functions of hyaluronic acid, the degree of sulfation $DS_s$ may be in the range from 0 to 4.

DS, was analyzed using two complementary techniques.

The fraction of sulfate by weight in the sample was analyzed using a turbidimetric method adapted from the literature [30].

The day before the analysis, gelatin was prepared at 5 g/L in water. On the day of the analysis, barium chloride ($BaCl_2$) was added to the solution to obtain a gelatin/$BaCl_2$ suspension with [$BaCl_2$]=5 g/L. The solution was stirred for two hours. 1.5-2 mg of sample was dissolved in 1M HCl to obtain [HAS]=1.5 g/L in a volume of 1000 mL. The suspension was heated for 3 hours at 107° C. and then cooled to room temperature. 25 to 55 μL of suspension was transferred to a vial, made up to 100 μL with 1M HCl, and then 700 μL of a solution of trichloroacetic acid (TCA) at 30 g/L was added, followed by 200 μL of a solution of 5 g/L of gelatin+5 g/L of $BaCl_2$.

The vial was stirred in a vortex stirrer every five minutes for 25 minutes, before measuring the absorbance at 360 nm. The calibration curve was established by mixing 40, 60, 80 or 100 μL of $Na_2SO_4$ at 0.59 g/L, adjusting to 100 μL with 1M HCl if necessary, and then adding 700 μL of a solution of TCA 30 g/L and 200 μL of a solution of 5 g/L of gelatin+5 g/L of $BaCl_2$. The blank was prepared by mixing 100 μL of 1M HCl+700 μL of TCA 30 g/L+200 μL of gelatin 5 g/L (without $BaCl_2$).

The fraction of glucuronic acid by weight in the sample was analyzed using a colorimetric method adapted from the literature [31], (each hyaluronic acid repeat unit contains a glucuronic acid). The day before the analysis, sodium tetraborate ($Na_2B_4O_7$) at 25 mM in concentrated sulfuric acid and 7.48 mM of carbazole in anhydrous ethanol were prepared (the carbazole solution is left in the refrigerator overnight, and the tetraborate solution is left overnight in the stove at 40° C.). A magnetic bar was not introduced, to avoid contamination. 0.7-1 mg of sample was dissolved in 1.5 mL of water, and then 40 μL was taken and was put in a 4 mL vial. The volume was adjusted to 200 μL with water. The calibration curve was established by preparing four different vials containing 5, 15, 25 and 40 μg of NaHA 100 kg/mol in 200 μL of water. 800 μL of $Na_2B_4O_7$ was added to all the vials (sample and calibration). The vials were stirred in the vortex stirrer, heated for 10 minutes at 100° C. in an oil bath and cooled in water for 15 minutes. 200 μL of carbazole solution was added. The vials were vortexed, heated for 10 minutes at 100° C. in an oil bath and cooled in water for 15 minutes. Absorbance was measured at 530 nm.

The degree of sulfation was calculated from the following equation.

$$DS_{sulfation} = \frac{w_{SO3Na}/M_{SO3Na}}{w_{HA\ repeat\ unti}/M_{HA\ repeat\ unit}} \quad \text{[Math 2]}$$

with $w_{SO3Na}$ representing the fraction of sulfate by weight in the sample, $w_{HA\ repeat\ unit}$ is the fraction of glucuronic acid by weight in the sample; $M_{SO3Na}$ is the molecular weight of $SO_3Na$; and $M_{HA\ repeat\ unit}$ is the molecular weight of a repeat unit of HA (=379.31 g/mol). The degree of sulfation obtained is $DS_s$=4. The sulfated hyaluronic acid thus obtained with a degree of sulfation of 4 is designated $HAS_4$.

($^1H$ NMR ($D_2O$, 353 K): 5.08-3.56 (10H+HOD peak at 4.25, m), 2.32-1.94 (3H, s)).

Degradation of Sulfated Hyaluronic Acid (HAS)

The degradation of the sulfated hyaluronic acid according to the invention by hyaluronidase, at 37° C., is compared against that of unmodified hyaluronic acid in accordance with the following protocol.

The modified hyaluronic acid according to the invention is dissolved at 2.49 mM (=2.016 g/L) in ammonium acetate buffer at 5 mM, pH 5, containing type VIII hyaluronidase obtained from bovine testes, at 1980 U/mL. The solution is filtered on 0.2 μm and then incubated at 37° C. with stirring. At the same time, for comparison, unmodified hyaluronic acid is dissolved at 2.49 mM (=1.000 g/L) in the same conditions.

After 56 days of incubation, the samples are heated for 10 min at 100° C. to denature the enzyme, cooled to room temperature, and then diluted to 0.7 g/L by adding 0.1 M solution of $NaNO_3$. The samples are then analyzed by size-exclusion chromatography (Waters GPC Alliance chromatograph, Parsippany, NJ, USA), equipped with a differential refractometer and a light scattering detector (MALLS) (Wyatt Technology, Goleta, CA, USA). The samples are injected at 0.7 g/L, eluted at 0.5 mL/min in 0.1 M $NaNO_3$/0.005 M $NaN_3$. The mobile phase and the samples are filtered beforehand on 0.1 μm before being injected. The dn/dc value used is 0.1551, which corresponds to the dn/dc value of hyaluronic acid reported in the literature.

By measuring the weight-average molecular weight, it is thus found that after 56 days of treatment, the hyaluronic acid is degraded to 85%, whereas the HAS is degraded to 73%.

Other Test of Degradability of Sulfated Hyaluronic Acid (HAS)

Protocol for Incubation of HAS with Hyaluronidase

Samples of HAS were incubated at 1 mg/mL at 37° C. for several weeks, in ammonium acetate buffer at pH 5, in the presence of 1000 U/mL of hyaluronidase from bovine testes. Then fractions of samples were divided into aliquots at different time points and were analyzed by SEC-MALS for determining the degradation of the HAS chains during incubation.

Protocol for Measuring Molecular Weights

The molecular weight distribution and the weight-average molecular weight of the sulfated hyaluronic acids were determined by size-exclusion chromatography (SEC) using a differential refractometer and a light scattering detector (MALS) (from Wyatt Technology, Santa Barbara, USA).

The samples were injected at a concentration of 0.7 mg/mL in 0.1 M $NaNO_3$/0.005 M $NaN_3$, at a flow rate of 0.5 mL/min and at a column temperature of 30° C. The samples and the mobile phases were filtered on 0.1 μm before being injected in the column.

Figure 7:
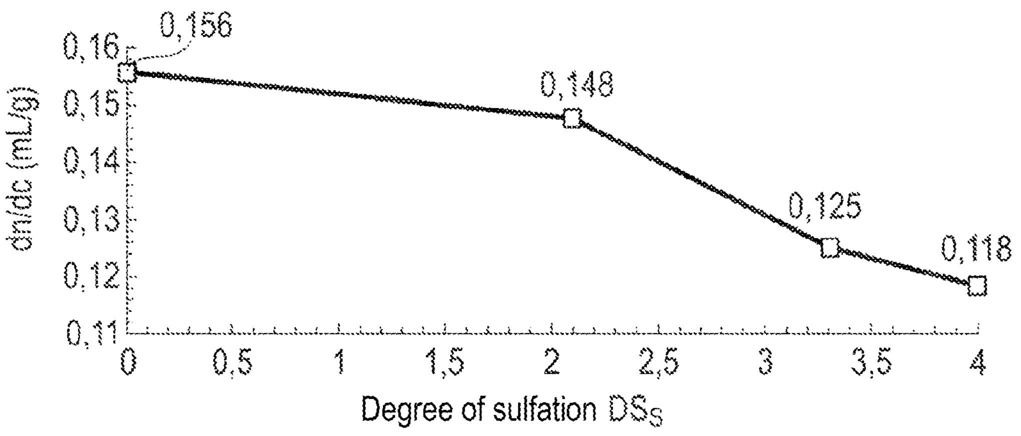
FIG. 7 shows the change in the values of dn/dc of sulfated hyaluronic acid for different degrees of sulfation, in the conditions of the degradability test described in example 1.1.

The change in refractive index as a function of the concentration values dn/dc of the pure and sulfated hyaluronic acid (degree of sulfation $DS_S$ of 2.1, 3.3 and 4) was determined with the same refractometer, using five concentrations between 0.05 and 0.40 g/mol (FIG. 7). These values are needed for processing the curves obtained by SEC-MALS.

Stock solutions at 0.5 g/L were prepared for each sample in 0.1 M $NaNO_3$/0.005 M $NaN_3$. Solutions diluted to 80, 60, 40, 20 and 10% were prepared.

Results of Degradation

Various samples of HA were incubated with hyaluronidase: unmodified HA, HAS with a degree of sulfation of 2.2 ($HAS_{2.2}$), HAS with a degree of sulfation of 4 ($HAS_4$).

The values of the ratio of the molecular weight of the polymer at time point t to the initial molecular weight of the polymer ($MW_f/MW_i$) as a function of the number of days of incubation (up to 84 days) are presented in Table 1 below.

TABLE 1

| Number of days of incubation | HA only | HA + hyaluronidase 1000 U/mL | $HAS_{2.2}$ only | $HAS_{2.2}$ + hyaluronidase 1000 U/mL | $HAS_4$ only | $HAS_4$ + hyaluronidase 500 U/mL | $HAS_4$ + hyaluronidase 1000 U/mL |
|---|---|---|---|---|---|---|---|
| Start 0 | 1 | 1 | 1 | 1 | 1 | 1 | 1 |
| 1 | 0.8705 ± 0.0225 | 0.0243 ± 0.0377 | 0.6687 ± 0.106 | 0.9497 ± 0.107 | 0.7616 ± 0.0750 | 0.9935 ± 0.0753 | 0.9843 ± 0.0662 |
| 3 | 0.972 ± 0.0248 | 0.01984 ± 0.0385 | 0.6224 ± 0.108 | 0.6452 ± 0.108 | 0.6798 ± 0.0587 | 0.8171 ± 0.0834 | 0.8665 ± 0.04836 |
| 14 | 0.9636 ± 0.0364 | 0.01825 ± 0.0438 | 0.5089 ± 0.0905 | 0.5086 ± 0.106 | 0.5324 ± 0.0686 | 0.5727 ± 0.0686 | 0.6503 ± 0.0651 |
| 28 | 0.9240 ± 0.0264 | 0.01542 ± 0.0383 | 0.3945 ± 0.0893 | 0.3021 ± 0.887 | 0.4130 ± 0.0754 | 0.4790 ± 0.0734 | 0.4583 ± 0.0566 |
| 84 | 0.8291 ± 0.0531 | 0.01306 ± 0.0390 | 0.2326 ± 0.0914 | — | 0.1964 ± 0.0762 | 0.3269 ± 0.0587 | 0.2691 ± 0.0645 |

Whereas HA alone degrades quickly in the presence of hyaluronidase at a concentration of 1000 U/mL ($MW_f/MW_i$ <0.025 in 24 hours), HA without hyaluronidase is stable, with degradation of 18% in three months ($MW_f/MW_i$<0.82).

Advantageously, $HAS_S$ with $DS_S$=4 and $DS_S$=2.2 display identical degradation behavior, independently of the concentration of hyaluronidase. Thus, all the samples show degradation of about 40±10% in two weeks ($MW_f/MW_i$~0.6) and of about 70±10% in three months ($MW_f/MW_i$18 0.3).

On comparing the degradation of the sulfated HAs without hyaluronidase, it can be seen that the sulfated HAs are less stable than the unmodified HAs. Regarding the degree of degradation of the $HAS_S$ with $DS_S$=4 and $DS_S$=2.2 in the presence of hyaluronidase, no significant difference is observed on varying the degree of sulfation or the concentration of hyaluronidase, which indicates that the sulfated HAs are not affected by the presence of the enzyme. The $HAS_S$ are therefore degradable, but not specifically biodegradable by the enzyme, as their degradation did not seem to be linked to the enzyme activity.

1.2. Grafting of Aromatic Rings on the Carboxyl Functions of Sulfated Hyaluronic Acid (HAS)

The second step in the synthesis of a modified hyaluronic acid according to the invention, represented schematically below, proceeds with the grafting of a fragment of 3-aminophenylboronic acid (PBA) on the carboxylic function of the HAS previously synthesized, leading to a modified hyaluronic acid designated "HAS-PBA".

The protocol is adapted from that described in the literature ([33], [34]).

[Chem 12]

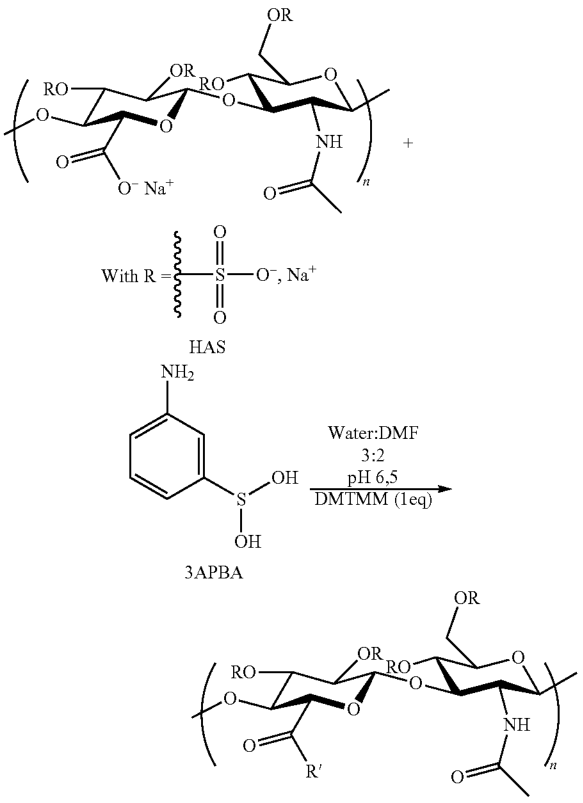

-continued

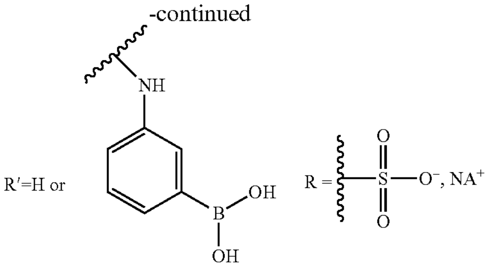

HAS-PBA 1 g of $HAS_4$ (1 equivalent) synthesized as described above was dissolved in 292 mL of water. 200 mL of DMF was slowly added dropwise. The mixture was stirred for one hour at room temperature. 68.92 mg of 3-aminophenylboronic acid (3APBA, 0.3 equivalent) was dissolved in 4 mL of water. 341.84 mg of 4-(4,6-dimethoxy-1,3,5-triazin-2-yl)-4-methylmorpholinium chloride (DMTMM) was dissolved in 4 mL of water. The DMTMM solution was added to the reaction mixture, and then the solution of 3APBA. The pH was adjusted to 6.5 with 2M NaOH. The mixture was stirred for 24 hours at room temperature. 9.29 g of NaCl was dissolved in 30 mL of water, and then added to the reaction mixture to obtain $[NaCl]_{final}$=0.3 M. The mixture was dialyzed by ultrafiltration against water treated by osmosis using a 10 kDa ultrafiltration membrane, until the conductivity of the filtered water was less than 7-8 μS/cm. The solution of $HAS_4$-$PBA_{0.3}$ was lyophilized.

Analysis of the degree of substitution of PBA ($DS_{PBA}$) was performed by 1H NMR integration: integration of the peak at 2.09 ppm corresponding to the N-acetyl protons of HA is normalized to 3.

The degree of substitution $DS_{PBA}$, calculated from the following equation, is about 0.3.

$$DS_{PBA}=(\int Ha+\int Hb+\int Hc+\int Hd)/4 \quad \text{[Math 3]}$$

The modified hyaluronic acid thus obtained, designated "$HAS_4$-$PBA_{0.3}$", was recovered at a yield greater than 90%, and a total yield from HA of about 50%.

($^1H$ NMR ($D_2O$, 353 K): 7.92-7.81 (0.3Ha, s), 7.70-7.53 (0.6Hb+c, dd), 7.50-7.40 (0.3H, d t), 5.08-3.56 (10H+HOD peak at 4.25, m), 2.32-1.94 (3H, s)).

Example 2

Preparation of an Ink Based on PEDOT:$HAS_4$-$PBA_{0.3}$ According to the Invention PEDOT is formed by oxidative polymerization starting from the EDOT monomers, as shown schematically below. The protocol was adapted from that described by Wallace et al. [23].

[Chem 13]

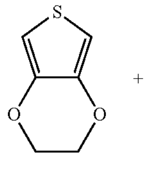

EDOT

-continued

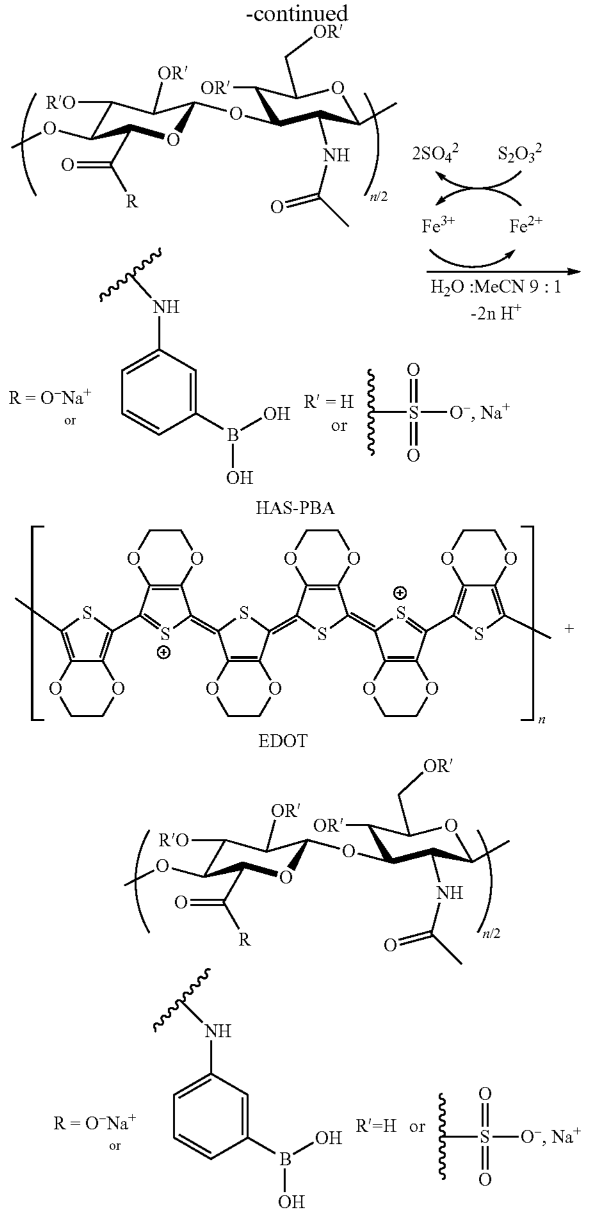

HAS-PBA

EDOT

HAS-PBA 1 g of $HAS_4$-$PBA_{0.30}$ (0.5 equivalent), synthesized previously, was dissolved in 16.11 mL of a degassed water: acetonitrile (MeCN) mixture 9:1 (or 8:2) v:v. 252 μL (334.4 mg, 1 eq) of EDOT was added. The mixture was stirred overnight at 4° C. under nitrogen. 9.8 mg of $FeSO_4$ (0.015 eq) was added. 713.9 mg of ammonium persulfate (APS) (1.33 eq) was dissolved in 16.1 mL of a degassed, cold water:MeCN mixture 9:1 (or 8:2 respectively) v:v, and then added dropwise in 1 hour to the mixture using a syringe pump. The mixture was stirred for 4 hours at 4° C. under nitrogen, and then at room temperature up to the end of polymerization (polymerization is considered ended when the pH is stable, below or about 1.1-1.3, generally after 18-24 hours). The reaction was stopped by adding 32 mL of water, and then the mixture was dialyzed against water treated by osmosis with a 6-8 kDa membrane, changing the bath every 4 to 10 hours until the conductivity of the water is less than 8 μS. Next, the pH was adjusted to 7.40, and then the reaction mixture was homogenized at 10 000 rpm for 10 minutes using an IKA Ultra Turrax® dispersing machine. The solution of PEDOT:$HAS_4$-$PBA_{0.3}$ was then lyophilized.

The ink was recovered at a yield between 85 and 90%.

Conductivity Measurements

Depositing a Film of Ink on Glass Plates

Glass plates were washed with acetone and ethanol, and then activated with $O_2$ plasma (450 sccm, 200 W, 500 s). The lyophilized PEDOT:$HAS_4$-$PBA_{0.3}$ ink was dissolved in water at 13 g/L and then stirred in the vortex stirrer. No additional treatment was applied. This concentration was selected to correspond to the concentration of PEDOT:PSS in the CleviosPH1000® commercial conductive ink. 60 μL of the suspension was deposited on a glass plate inside a silicone ring with 1 cm inside diameter serving as detachable well, and dried at room temperature.

Conductivity Measurements

The thickness of the ink film, designated h, was measured with a Dektak DXT profilometer from Bruker. The resistivity of the film, designated $R_{Sheet}$, was determined using the 4-point probe marketed by Ossila (Power Cord Type, Sheffield, England), over a wide range of voltage and current to certify the ohmic behavior. The conductivity was calculated from the following equation:

$$\sigma = 1/R_{sheet} \cdot h \cdot c \qquad \text{[Math 4]}$$

with c being the geometric correction factor determined by the software.

The conductivity was measured in several regions of the film, and then averaged.

Figure 2:
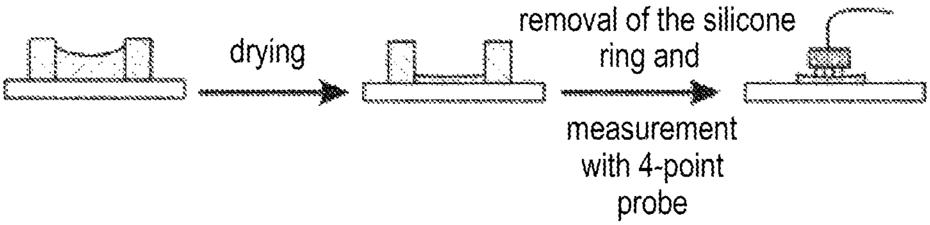
FIG. 2 shows, schematically, the protocol for measuring the conductivity of a film formed from PEDOT:$HAS_4$-$PBA_{0.3}$ ink in example 2.

FIG. 2 shows schematically the steps of the conductivity measurement protocol.

In these conditions, without other modifications, the PEDOT:$HAS_4$-$PBA_{0.3}$ ink has a conductivity of up to 2.18 S/cm. For comparison, the CleviosPH1000® ink has a conductivity of 0.11 S/cm.

Example 3

Preparation of a Modified Hyaluronic Acid According to the Invention Bearing Sulfate Groups, Grafts Comprising an Aromatic Ring and Grafts Having a Crosslinkable Function ($HAS_4$-$PBA_{0.3}$-$PEGene_{0.16}$), and PEDOT:$HAS_4$-$PBA_{0.3}$-$PEGene_{0.16}$ Ink Preparation of the Modified Hyaluronic Acid $HAS_4$-$PBA_{0.3}$-$PEGene_{0.16}$ Synthesis of the Molecule to be Grafted, Bearing a Crosslinkable Function The molecule synthesized, of the following formula (G1), is designated PA-HN-$(PEG)_{11}$-$NH_2$ and denoted more simply hereinafter "PEGene", referring to the poly(ethylene glycol) chain and the terminal ethenyl function.

[Chem 14]

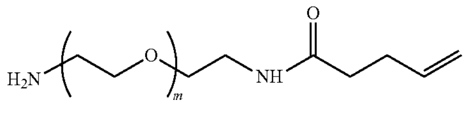

The PEGene molecule was synthesized, as described below, starting from a PEG-bis(amine) derivative protected at one end with a tert-butoxycarbonyl group (Boc), (O-(2-aminoethyl)-O'-[2-(Boc-amino)ethyl]deca(ethylene glycol), designated $H_2N$-$(PEG)_{11}$-NH-Boc.

Pentenoic anhydride (PA) then reacted with the free amine function, then the other amine function is deprotected to lead to the compound PA-HN-$(PEG)_{11}$-$NH_2$, following the protocol detailed below.

Reaction of the Amine with Pentenoic Anhydride 1 g of O-(2-aminoethyl)-O'-[2-(Boc-amino)ethyl]deca (ethylene glycol) ($H_2N$-$(PEG)_{11}$-NH-Boc) was dissolved in 185 mL of DMF. Then 340.1 μL of pentenoic anhydride (PA, 1.2 eq.) and 324.2 μL of N,N-diisopropylethylamine (1.2 eq.) were added. The reaction mixture was stirred for 24 hours at room temperature. Then the DMF was evaporated under vacuum, and the resultant oil was purified on a chromatography column (silica gel, dichloromethane/methanol 95/5 (v/v)) to give PA-NH-$(PEG)_{11}$-NH-Boc in the form of yellow oil ($^1H$ NMR ($D_2O$, 298 K): 6.00-5.85 (1H, m), 5.17-5.04 (2H, qq), 4.80 (HOD, s), 3.82-3.67 (40H, d), 3.67-3.60 (4H, td), 3.44-3.39 (2H, t), 3.33-3.27 (2H, t), 2.41-2.34 (4H, m), 1.53-1.42 (9Hboc, s)).

[Chem 15]

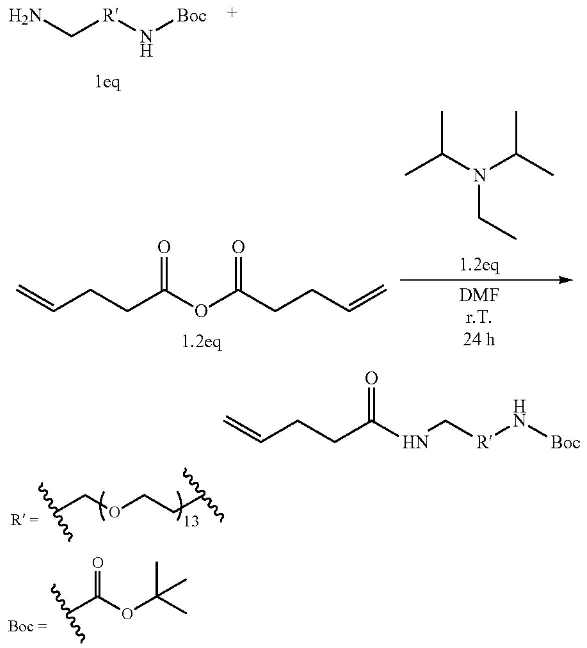

Hydrolysis of the Tert-Butoxycarbonyl Protective Group (Boc)

7.169 mL of pure trifluoroacetic acid (60 eq) was added dropwise and the mixture was stirred for 5 minutes. 70 mL of 1M NaOH was added slowly at about 0° C. (ice bath), and then the pH was adjusted to 4.5. The solution was then loaded on an ion-exchange column filled with AG-MP50® resin in the $H^+$ form from BioRad (inside diameter 3 cm, height 30 cm) and rinsed with 100 mL of water to pH 4.5, and then 400 mL of water. The amine was released by eluting ammonium hydroxide ($NH_4OH$) at 4% v/v. The water was then evaporated under vacuum, leading to the desired PEGene molecule. ($^1H$ NMR ($D_2O$, 298 K): 5.95-5.82 (1H, m), 5.17-5.04 (2H, qq), 4.80 (HOD, s), 3.82-3.67 (40H, d), 3.67-3.60 (4H, td), 3.44-3.39 (2H, t), 2.93-2.87 (2H, t), 2.42-2.34 (4H, m)).

[Chem 16]

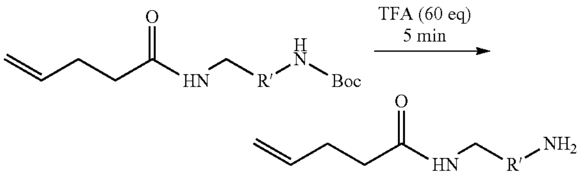

Synthesis of Modified Hyaluronic Acid

The sulfated hyaluronic acid $HAS_4$ synthesized in example 1 was modified by grafting of grafts of the phenylboronic acid type (PBA) and of PEGene molecules at the level of the carboxylic functions, in the same conditions as the grafting of 3-aminophenylboronic acid (3APBA).

The reaction of grafting of the PEGene molecules on sulfated hyaluronic acid is shown schematically below.

[Chem 17]

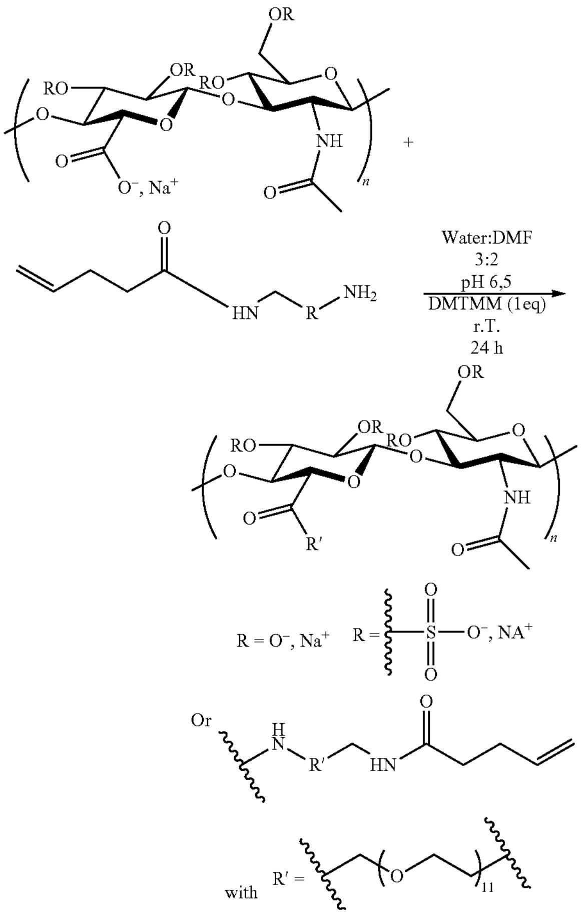

1 g of $HAS_4$ (1 equivalent) was dissolved in 288 mL of water. 200 mL of DMF was added slowly. The reaction mixture was stirred for one hour at room temperature. 68.92 mg of 3-aminophenylboronic acid (3APBA, 0.3 eq.) was dissolved in 4 mL of water. 309.7 mg of PEGene (0.4 eq.) was dissolved in 4 mL of water. 341.84 mg of DMTMM was dissolved in 4 mL of water. The DMTMM solution was added to the reaction mixture, then the 3APBA solution, and then the PEGene solution. The pH was adjusted to 6.5 with 2M NaOH and 2M HCl 1M. The mixture was stirred for 24 hours at room temperature. 9.29 g of NaCl was dissolved in 30 mL of water, and then added to the reaction mixture to obtain $[NaCl]_{final}$=0.3 M. The product was purified by ultrafiltration against water treated by osmosis, using a 10 kDa ultrafiltration membrane, until the conductivity of the filtered water was less than 7-8 μS/cm. The solution of the modified hyaluronic acid "$HAS_4$-$PBA_{0.3}$-$PEGene_{0.16}$" was frozen in liquid nitrogen and lyophilized.

Analysis of the degree of substitution with PEGene molecules ($DS_{PEGene}$) was performed by $^1$H NMR integration: integration of the signal at 2.09 ppm corresponding to the protons of the N-acetyl group of HA is normalized to 3.

The degree of substitution $DS_{PEGene}$, calculated from the equation $$DS_{PEGene}=\int H_1 \quad \text{[Math 5]}$$

is about 0.16.

The degree of substitution $DS_{PBA}$, calculated as described above, is about 0.3.

The modified hyaluronic acid $HAS_4$-$PBA_{0.3}$-$PEGene_{0.16}$ was recovered at a yield greater than 90%, and a total yield starting from the initial HA of about 50%.

($^1$H NMR ($D_2O$, 353 K): 7.92-7.81 (0.3Ha, s), 7.70-7.53 (0.6Hb+c, dd), 7.50-7.40 (0.3H, d t), 5.95-5.82 ($1H_1$, m), 5.23-3.26 (m+HOD peak at 4.25), 2.40-2.33 (0.64H, s), 2.32-1.94 (3H, s)).

Preparation of an Ink Based on PEDOT:$HAS_4$-$PBA_{0.3}$-$PEGene_{0.16}$

An ink is prepared according to the same protocol as that described above in example 3 for synthesis of the ink based on PEDOT:$HAS_4$-$PBA_{0.3}$, using 0.5 equivalent of modified hyaluronic acid relative to the EDOT monomers.

Example 4

Synthesis of a Modified Hyaluronic Acid According to the Invention Bearing Sulfate Groups and Grafts Comprising Both an Aromatic Ring and a Crosslinkable Function ($HAS_4$-$ArEne_{0.30}$)

Preparation of the Modified Hyaluronic Acid $HAS_4$-$ArEne_{0.30}$

4-[(Pent-4-en-1-yloxy)methyl]aniline (designated ArEne), available commercially, was grafted onto the sulfated hyaluronic acid prepared in example 1, $HAS_4$, following the same protocol as that for grafting of the 3-aminophenylboric acid (3APBA) on $HAS_4$.

1 g of $HAS_4$ (1 equivalent) was dissolved in 293 mL of water. 198 mL of DMF was slowly added dropwise. The mixture was stirred for 1 hour at room temperature. 70.9 mg of ArEne (0.3 eq) was dissolved in 4 mL of DMF. 341.84 mg of DMTMM was dissolved in 4 mL of water. The DMTMM solution was added to the reaction mixture, and then the ArEne solution. The pH was adjusted to 6.5 by adding either 2 M NaOH or 2M HCl 1M. The mixture was stirred for 24 hours at room temperature. 9.29 g of NaCl was dissolved in 30 mL of water, and then added to the reaction mixture to obtain $[NaCl]_{final}$=0.3 M. The product was purified by ultrafiltration against water treated by osmosis using a 10 kDa ultrafiltration membrane, until the conductivity of the filtered water was less than 7-8 μS/cm. The $HAS_4$-$ArEne_{0.30}$ solution was lyophilized.

The grafting reaction is shown schematically below.

[Chem 18]

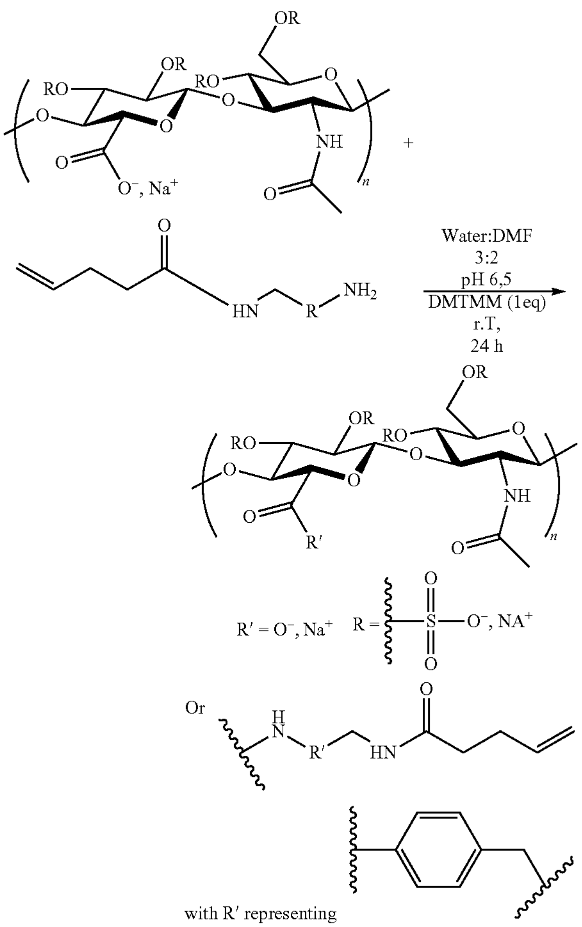

The degree of substitution with ArEne ($DS_{ArEne}$) cannot be obtained precisely by 1H NMR since the N-acetyl protons of HA at 2.09 ppm usually employed for normalizing the integration are superposed with the two aliphatic protons of ArEne.

The degree of substitution $DS_{ArEne}$ is determined by studying the kinetics of the grafting reaction, by determining the remaining primary amines with 2,4,6-trinitrobenzenesulfonic acid (TNBS), which gives an orange final compound (trinitrophenylamine) that absorbs in the UV at 340 nm.

The calibration curves of the primary amine (4-[(pent-4-en-1-yloxy)methyl]aniline) were established by preparing different solutions of 1 mL of primary amine at known concentrations (10 to 50 μg/mL) in sodium bicarbonate buffer at 100 mM pH 8.5, starting from a stock solution of amine at 1 g/L in the same buffer. Different volumes of a freshly prepared solution of TBNS at 0.01% w:v in the same buffer were added to each solution, so as to have an amine/TNBS molar ratio of 1, and then the samples were incubated for 2 hours at 37° C. Finally, 150 μL of HCl was added to each solution, and then the spectra from 580 to 280 nm were recorded. The calibration curve is deduced using the maximum absorbance.

The same procedure was used for quantifying the amines in solution during the coupling reaction of ArEne with HAS: the ArEne fraction that had not reacted during the coupling reaction with HAS is deduced from the calibration curve previously established.

After 24 h, it is found that 100% of the ArEne has reacted with HAS, which gives a degree of substitution $DS_{AEne}$ of 0.3.

$^{1}H$ NMR ($D_2O$, 353 K): 7.68-7.53 (0.68H, d), 7.48-7.34 (0.68H, d), 6.00-5.84 ($0.34H_1$, m), 5.17-3.49 (m+HOD peak at 4.25), 2.33-1.92 (3.8H, m), 1.76-1.61 (0.68H, q)).

Preparation of an Ink Based on PEDOT:$HAS_4$-$ArEne_{0.30}$

An ink is prepared following the same protocol as that described above in example 3 for synthesis of the ink based on PEDOT:$HAS_4$-$ArEene_{0.3}$, using 0.5 equivalent of modified hyaluronic acid relative to the EDOT monomers.

According to similar protocols, an ink is prepared based on PEDOT:$HAS_4$-$ArEene_{0.5}$.

Example 5

Preparation of Hydrogel Films Starting from PEDOT:$HAS_4$-$PBA_{0.3}$-$PEGene_{0.16}$ Ink The ink synthesized in example 3, PEDOT:$HAS_4$-$PBA_{0.3}$-$PEGene_{0.16}$, was crosslinked using so-called "thiol-ene" chemistry, with a dithiol poly(ethylene glycol) (PEG-$(SH)_2$) of weight-average molecular weight $M_w$=3.5 kg/mol as crosslinking agent, and lithium phenyl-2,4,6-trimethylbenzoylphosphinate as photoinitiator.

Functionalization of Glass Plates with Thiol Functions

The plates were rinsed with acetone and ethanol, and then activated with $O_2$ plasma (450 sccm, 200 W, 500 s), and immersed overnight at 80° C. in 5 mM of 3-mercaptopropyltrimethoxysilane (MPTMS) in toluene. They were then sonicated for 5 minutes in acetone, 5 minutes in ethanol, and then centrifuged for 10 minutes at 1000 rpm to dry them. They were finally annealed for 3 hours at 110° C. and stored in the dark under argon. Before use, the glass plates functionalized with thiol functions were immersed for 1 hour in a solution of dithiothreitol (DTT) at 0.5 g/L at pH 8.3 to reduce the disulfide bonds at the surface of the plate.

Formation of a Hydrogel Film on the Glass Plates

The lyophilized PEDOT:$HAS_4$-$PBA_{0.3}$-$PEGene_{0.16}$ ink, prepared according to example 3, was dissolved in water with polyethylene glycol dithiol (PEG-(SH) 2 (3.5 kg/mol) as crosslinking agent, and a photoinitiator, LAP (lithium phenyl-2,4,6-trimethylbenzoylphosphinate), to obtain [PEDOT:$HAS_4$-$PBA_{0.3}$-$PEGene_{0.16}$]=60 g/L, at a concentration [LAP]=1 g/L and to give 0.9 thiol function per alkene function.

The suspension was stirred in a vortex stirrer for 10 minutes. 60 µL of suspension was deposited on the various glass plates (whether or not functionalized with thiol functions) inside a silicone ring of 1 cm inside diameter serving as detachable well and exposed for 5 minutes at 405 nm to 90 mW/$cm^2$ for crosslinking. The ink was then dried at room temperature.

Conductivity Measurements

The thickness of the ink film, designated h, was measured with a Dektak DXT profilometer from Bruker. The resistivity of the film, designated $R_{Sheet}$, was determined using the 4-point probe marketed by Ossila (Power Cord Type, Sheffield, England), over a wide range of voltage and current to certify the ohmic behavior. The conductivity was calculated from the following equation:

$$\sigma=1/R_{sheet}\cdot h\cdot c \quad \text{[Math 6]}$$

with c the geometric correction factor determined by the software.

The conductivity was measured in several regions of the film, and then averaged.

Figure 3:
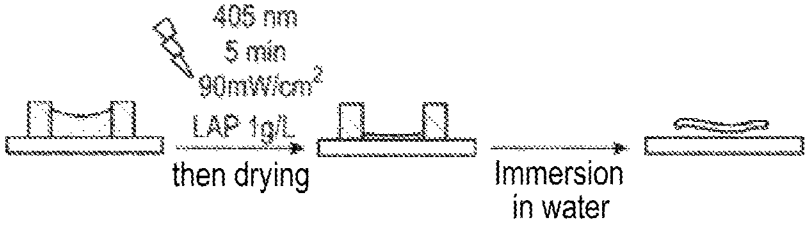
FIG. 3 shows, schematically, the steps in the formation of a crosslinked film of PEDOT:$HAS_4$-$PBA_{0.3}$-$PEGene_{0.16}$, on the surface of an unfunctionalized glass plate, and immersion thereof in water, as described in example 5.

FIG. 3 shows schematically the steps in formation of the crosslinked film of PEDOT:$HAS_4$-$PBA_{0.3}$-$PEGene_{0.16}$, on the surface of an unfunctionalized glass plate, and immersion thereof in water.

When deposited on an unfunctionalized glass plate, the film of crosslinked ink could be detached from the glass plate, resulting in a blue disk floating in water, and which had not dissolved again after 2 weeks in PBS 1×.

Figure 4:
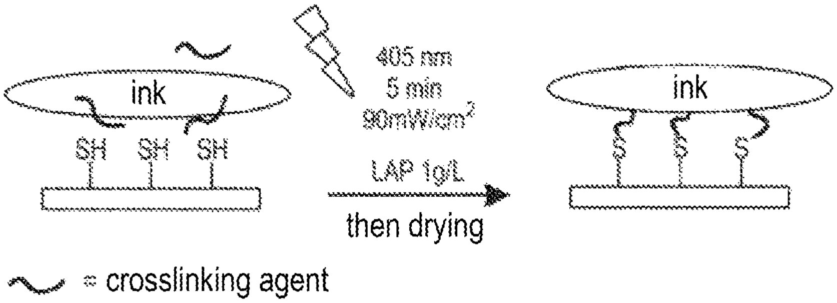
FIG. 4 shows, schematically, the crosslinking of the ink and the grafting thereof on the surface of a glass plate functionalized with thiol functions, as described in example 5.

FIG. 4 shows schematically the crosslinking of the ink and grafting thereof on the surface of a glass plate functionalized with thiol functions.

When deposited on the surface of a glass plate functionalized with thiol functions, the film of crosslinked ink was bound covalently to the surface of the plate, and could undergo several cycles of hydration/drying without becoming detached from the surface and without losing its conductivity properties.

Figure 5:
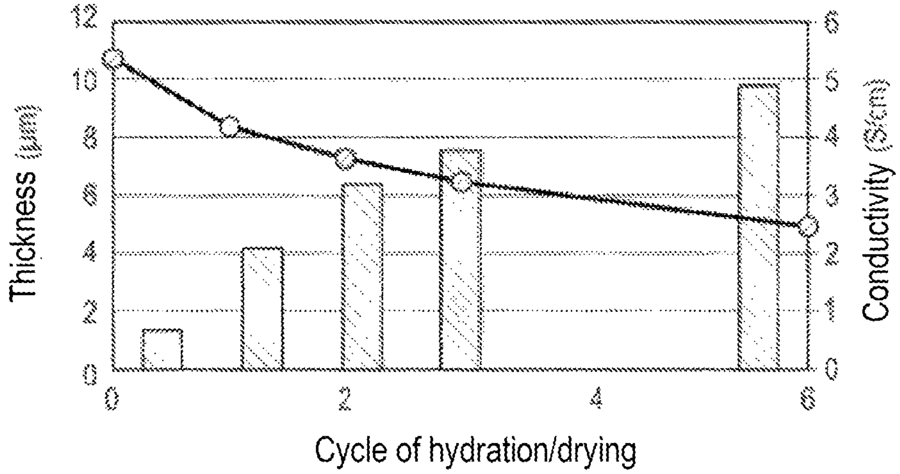
FIG. 5 shows the curves of variation of the thickness of the crosslinked hydrogel film and its conductivity as a function of the hydration/drying cycle number, as described in example 5.

FIG. 5 shows the curves of the change in thickness of the crosslinked film and its conductivity as a function of the hydration/drying cycle number.

The increase in conductivity with the number of cycles may be attributed to removal of the excess polyelectrolyte in the course of the cycles, as evidenced by the slow decrease in film thickness, thus leading to concentration of the PEDOT domains.

Example 6

Preparation of Hydrogel Films Starting from PEDOT:$HAS_4$-$ArEene_{0.5}$ Ink

Hydrogel films were prepared on the surface of glass plates not functionalized with thiol functions, starting from ink based on PEDOT:$HAS_4$-$ArEene_{0.5}$ (example 4).

The protocol for preparation of the hydrogel films is the same as that described in example 5, using two different crosslinking agents, PEG-$(SH)_2$ (3.5 kg/mol) and dithiothreitol DTT (3.5 kg/mol), and with concentrations of the suspensions before crosslinking [PEDOT:$HAS_4$-$ArEene_{0.5}$]= 40 g/L.

The hydrogel films thus formed were detached from the glass plates.

Example 7

Preparation of a Thick Conductive Hydrogel According to Another Procedure

Synthesis of the Hydrogel Starting from the Modified HA from Example 4

The lyophilized modified HA, $HAS_4$-$ArEne_{0.5}$, prepared according to example 4, was dissolved in water with polyethylene glycol dithiol (PEG-(SH) 2 3.5 kg/mol) as crosslinking agent, and a photoinitiator, LAP (lithium phenyl-2,4,6-trimethylbenzoylphosphinate), to obtain [$HAS_4$-$ArEne_{0.5}$]=20 g/L, [LAP]=0.5 g/L and 1 thiol function per alkene function. 250 µL is deposited in a cavity mold (a cap of an Eppendorf tube), and the solution is irradiated for 10 min at 365 nm at 20 mW/$cm^2$, resulting in a wet hydrogel based on HAS-$ArEn_{0.5}$.

Evaluation of the Viscoelastic Properties of the Hydrogel

The hydrogels formed are characterized by rheological measurements in dynamic conditions using an AR2000EX rheometer from TA Instruments.

The lyophilized modified HA, $HAS_4$-$ArEne_{0.5}$, prepared according to example 4, was dissolved in water with poly (ethylene glycol) dithiol (PEG-(SH) 2 3.5 kg/mol) as crosslinking agent (or DTT respectively), and a photoinitiator, LAP (lithium phenyl-2,4,6-trimethylbenzoylphosphinate), to obtain [$HAS_4$-$ArEne_{0.5}$]=40 g/L, at a concentration [LAP]=1 g/L and to give 1 thiol function per alkene function.

400 μL of this solution is deposited on the plate of an AR2000EX rheometer from TA Instruments' Anton Paar equipped with a UV cell (A=365 nm) and aluminum flat geometry of 20 mm diameter. The space between the plate and the geometry is fixed at 1160 μm. The solution is irradiated at 20 $mW/cm^2$ for 20 min at a frequency of 1 Hz under a deformation of 3.5%, leading to gelation thereof. Its loss modulus and elastic modulus are then measured.

Figure 6:
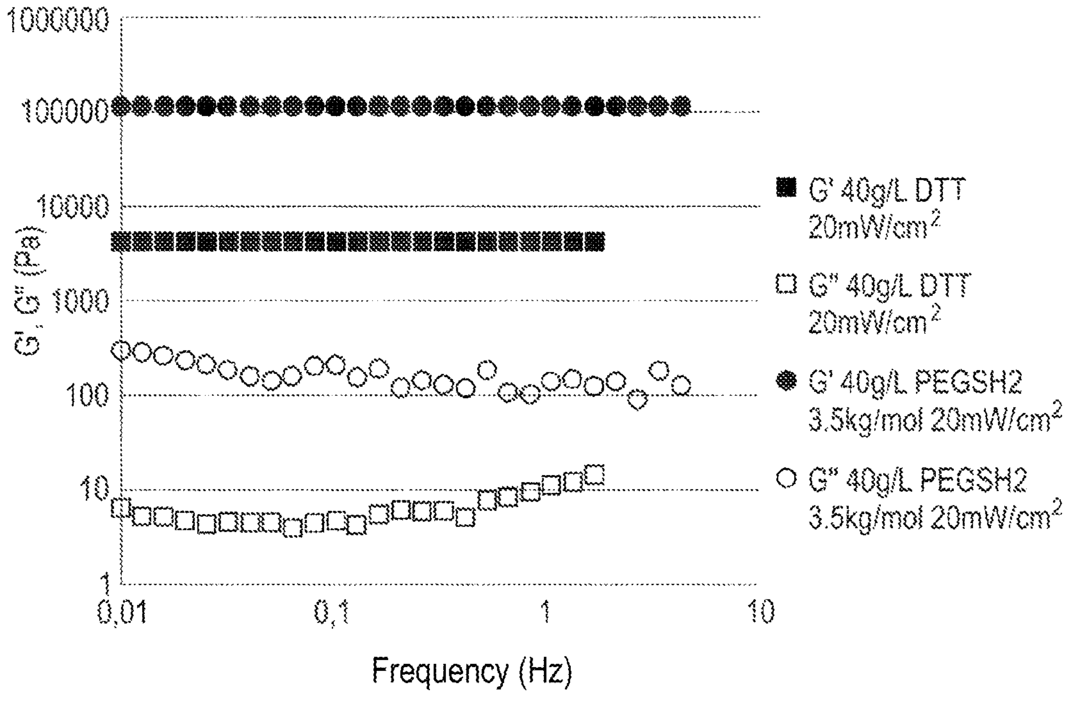
FIG. 6 shows the curves of variation of the elastic modulus G' and loss modulus G", obtained by rheological analysis, in dynamic conditions, of the hydrogels according to the invention based on $HAS_4$-$ArEne_{0.50}$, crosslinked with DTT or PEG-$(SH)_2$ according to example 7.

FIG. 6 shows the variation, as a function of frequency, of the storage modulus, also called elastic modulus, G' and the loss modulus, also called viscous modulus, G" for the hydrogels based on $HAS_4$-$ArEene_{0.5}$, crosslinked respectively with DTT (curves with squares) and with PEG-$(SH)_2$ (curves with circles).

It is observed constantly that the elastic modulus (G') for each of the hydrogels is greater than the loss modulus (G"), which provides evidence that the materials prepared according to the invention do indeed behave as hydrogels and not as viscous fluids.

Polymerization of EDOT in the Hydrogel

This wet hydrogel is held at −18° C. for 2 hours before being lyophilized, resulting in a dry aerogel (dry hydrogel) of HAS-$ArEne_{0.5}$ crosslinked with PEG bis(thiol).

Said aerogel is immersed for 15 hours in 2 mL of water:acetonitrile solution 6:4 v:v containing EDOT at 90.38 mM, at room temperature with stirring. After 15 hours, the supernatant is removed. The swollen hydrogel of HAS-$ArEne_{0.5}$ of EDOT is immersed for 48 hours with stirring at room temperature in 2 mL of water:acetonitrile solution 6:4 v:v containing ammonium persulfate at 135.57 mM and $FeSO_4$ at 1.36 mM.

The supernatant is removed, and the hydrogel of HAS-ArEne loaded with PEDOT is purified by 4 successive washings of 2 hours in water:acetonitrile 8:2 v:v, and then in PBS. A thick hydrogel of PEDOT:HAS-$ArEne_{0.5}$ is obtained.

Example 8

8.1. Preparation of a PEDOT:Modified HA Hydrogel According to Another Procedure where Polymerization of EDOT is Carried Out Simultaneously with the Crosslinking of the Hydrogel For this test, the modified hyaluronic acid $HAS_4$-$PBA_{0.3}$ prepared according to example 1 was crosslinked using adipic acid dihydrazide (ADH) by an amide coupling reaction using N-(3-dimethylaminopropyl)-N'-ethylcarbodiimide hydrochloride (EDC) as coupling agent, as shown schematically below.

ADH is a biocompatible compound, widely used for crosslinking water-based emulsions and making it possible to design biodegradable hydrogels. Moreover, the low pKa of the hydrazide function (≈3.4) allows coupling reactions at low pH, which is obligatory for a coupling reaction carried out simultaneously with the polymerization of EDOT, which releases protons.

[Chem 19]

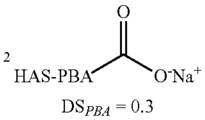

$DS_{PBA}$ = 0.3

-continued

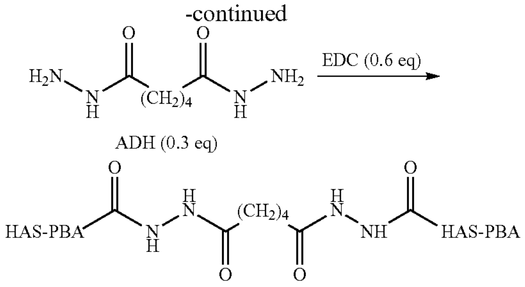

Protocol for Preparing the Gel $HAS_4$-$PBA_{0.3}$ was dissolved at 40 g/L in 0.1 M MES+0.5 M NaCl buffer of pH 4.75, with ADH at 2.2 g/L to give a molar ratio $n_{hydrazide}/n_{carboxylate}$=0.90; EDOT to give 2 equivalents of EDOT relative to $HAS_4$-$PBA_{0.3}$, and APS at 217.7 g/L to give a molar ratio $n_{APS}/N_{EDOT}$=1. The mixture was stirred at 25 000 rev/min using an IKA UltraTurrax T-10 basic dispersing machine with an S10 N-8G dispersing tool (Roth, Karlsruhe, Germany). Then concentrated EDC was added to the emulsion to give a molar ratio $n_{EDC}/n_{carboxylate}$=1.5. The emulsion is mixed for an additional 10 seconds before being poured immediately in the desired mold. After about 24 hours for carrying out the two reactions (gelation (about 4 hours) and polymerization of EDOT (about 20 hours)), the PEDOT:$HAS_4$-$PBA_{0.3}$/ADH hydrogel was immersed in three successive PBS baths for at least 4 hours to remove the reaction byproducts, to adjust the salt concentration of the matrix, and to neutralize the pH of the hydrogel.

The protocol is also applicable when using BisTris and Tris buffers instead of the MES buffer.

The characteristics for formation of the hydrogel when simultaneously carrying out crosslinking of the chains of modified hyaluronic acid to form a hydrogel, and polymerization of PEDOT starting from EDOT, are presented in the following Table 2.

TABLE 2

| Hydrogel cross-linking parameters | | | EDOT polymerization parameters | |
|---|---|---|---|---|
| [$HAS_4$-$PBA_{0.3}$] (g/L) | ratio $n_{hydrazide}/n_{carboxylate}$ | ratio $n_{EDC}/n_{carboxylate}$ | Molar ratio $n_{EDOT}/n_{HAS4\text{-}PBA0.3}$ | Molar ratio $n_{APS}/n_{EDOT}$ |
| 40 | 0.90 | 1.5 | 2 | 1 |

8.2. Characterization of the PEDOT:$HAS_4$-$PBA_{0.3}$/ADH Hydrogel

All the tests were repeated on three PEDOT:$HAS_4$-$PBA_{0.3}$/ADH hydrogels.

8.2.1. Characterization of the Mechanical Properties of the Hydrogel

To measure the mechanical properties of the hydrogel, compression tests were carried out on three hydrogels of the same kind PEDOT:$HAS_4$-$PBA_{0.3}$/ADH.

The hydrogel precursor mixture was poured into a cylindrical mold ($Ø_{int}$=5 mm, h=4 mm) and, after crosslinking (~20 hours), the cylindrical hydrogel was removed from the mold and swollen in PBS to remove the reaction byproducts and to neutralize its pH.

Tests of uniaxial compression were carried out using an EZ-X texture analyzer (Shimadzu, Marne-la-Vallée, France)

equipped with a 5 N cell. The hydrogel, in the form of a cylinder (about 5 mm diameter and 4 mm initial height), was placed on the lower plate of the texture analyzer and brought into contact with the upper plate with a preloading force of 0.03 N. The measurements were carried out at a compression rate of 17 μm/s. The cycles of compression were carried out as follows: the sample was compressed until 10% deformation was reached, and then the upper plate was raised up to the expanded gel state (0% deformation). Successive compressions of 20%, 30%, 40% and 50% deformation were then carried out on the same sample, each time returning to the state of 0% deformation between each compression. The data on load and displacements were collected in the course of each experiment. The normal stress $\sigma_{nominal}$ was calculated as the normal force divided by the area of the material, whereas the measured displacements λ were expressed as extension ratio, $\lambda=(h0-\Delta h)/h0$, where Δh is the measured displacement and h0 is the initial height of the hydrogel. The storage modulus G' of the materials can be calculated as the slopes of $\sigma_{nominal}=(\lambda-1/\lambda^2)$ in the linear response of the gel, as described in the Neo-Hookean model [49]-[51].

Analysis of the data has made it possible to obtain the storage modulus G' of the hydrogel for each cycle of compression (Table 3). G' was relatively constant from one cycle to another, indicating reversibility of compression. Finally: G'=1.6±0.4 kPa.

TABLE 3

Storage moduli G' of the hydrogels obtained in successive tests of uniaxial compression

| Compression | 10% | 20% | 30% | 40% | 50% | mean |
|---|---|---|---|---|---|---|
| G' gel 1 | 1439 | 1640 | 1518 | 1368 | 1243 | 1441.6 |
| G' gel 2 | 1247 | 1359 | 1323 | 1208 | 1097 | 1246.8 |
| G' gel 3 | 2007 | 2421 | 2146 | 1970 | 1801 | 2069 |
| | | | | | mean | 1585.8 |
| | | | | | standard deviation | 429.65 |

8.2.2. Characterization of the Swelling Behavior of the Hydrogel

The degree of swelling of the hydrogel was measured. To summarize, after crosslinking, the hydrogel was immersed in PBS for swelling until stabilization of the mass (2-3 days). The swollen mass in PBS ($ms_{swollen\ PBS}$) was measured. Then the hydrogel was immersed in successive water baths to remove all the PBS salts; lyophilized, and its dry mass ($m_{dry}$) was measured. The test was carried out for three PEDOT:$HAS_4$-$PBA_{0.3}$/ADH hydrogels. The swelling ratio Q of the hydrogel was determined as: $Q=ms_{swollen\ PBS}/m_{dry}=18\pm3$ (for the three hydrogels).

8.2.3. Characterization of the Electrochemical Properties of the PEDOT:$HAS_4$-$PBA_{0.3}$/ADH Hydrogel The electrochemical properties of the PEDOT:$HAS_4$-$PBA_{0.3}$/ADH conductive hydrogels were studied to evaluate their potential application in bioelectronic devices. With a view to application of the conductive hydrogels developed for the monitoring and/or stimulation of biological tissues, the targeted electrochemical values are summarized in the following Table 4.

TABLE 4 target values for the conductive hydrogels

| Property | Target value | Reference value for a Pt electrode |
|---|---|---|
| Charge storage capacity (CSC) (mC/cm$^2$) | >1 | 0.55 |
| Charge injection capacity (CIC) (μC/cm$^2$) | >100 | 35-54 |
| Impedance \|Z\| at 1 kHz (Ω) | As low as possible, <6 × $10^5$ Ω | 1-1000 depending on electrode size |

Summarizing, the charge storage capacity must be at least greater than 1 mC/cm$^2$ to be competitive with a conventional electrode for recording stimulation [52]; the charge injection capacity CIC greater than 100 μC/cm$^2$ to exceed the CIC of the Pt electrode in vivo [53]; and the impedance at 1 KHz must be as low as possible to improve the quality of recording/stimulation [54], with a suitable range between 0.1 and 600 kΩ for recording neuronal signals [55].

Protocols of the Electrochemical Measurements

Figure 8:
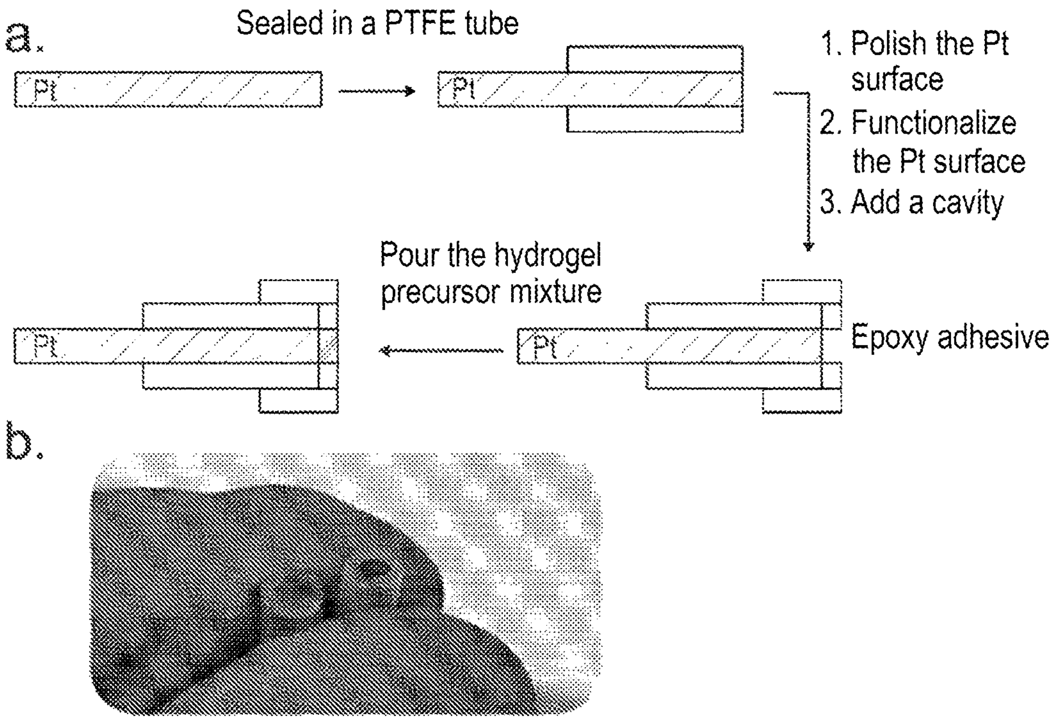
FIG. 8 shows, schematically, the preparation of a cavity electrode incorporating a conductive hydrogel of PEDOT: $HAS_4$-$PBA_{0.3}$/ADH, as described in example 8 (FIG. 8*a*) and a photograph of the PTFE tube incorporating the electropolymerized hydrogel on the surface of platinum.

A "home-made" cavity electrode was made using a platinum rod with length of 4 cm and diameter of 2 mm. The Pt rod was inserted in a PTFE tube with 2 mm inside diameter, and the space between the rod and the tube was sealed with epoxy resin to prevent escapes of water along the tube, which would alter the reactive surface area of the electrode (FIG. 8).

The tip of the Pt rod was polished by successive pickling, and the final polishing was carried out using 1 μm diamond-impregnated paste (RadioSpares). Then it was rinsed with ultra-purified water, then ethanol, and sonicated for 10 minutes in ethanol.

PEDOT:$HAS_4$-$PBA_{0.3}$ was then electropolymerized on the platinum surface, in order to graft the hydrogel on the surface of the platinum during simultaneous crosslinking of the hydrogel and polymerization of EDOT. A solution of EDOT at 5 mM and $HAS_4$-$PBA_{0.3}$ at 10 mM in DI water was prepared and degassed, and used immediately as medium for cyclic voltammetry of the surface of the Pt. A three-electrode cell was used, the working electrode being the polished Pt rod in a PTFE tube; the reference electrode being a conventional Ag/AgCl electrode (([KCl] 3M) for aqueous measurements; the counterelectrode being a platinum sheet. PEDOT:$HAS_4$-$PBA_{0.3}$ was electropolymerized by carrying out 10 voltage cycles from −0.6 V to 0.96 V at 25 mV/s. The resulting functionalized surface was slightly blue (FIG. 8*b*).

This surface functionalized with a thin layer of electropolymerized PEDOT:$HAS_4$-$PBA_{0.3}$ is then suitable for making the hydrogel, which will remain fixed to the surface.

Finally, the cavity was stacked on the functionalized Pt surface, using a section of tube with inside diameter of 2 mm wedged inside a larger tube. For all the electrodes, 6 μL of the hydrogel precursor mixture was poured into the cavity on the functionalized Pt surface, and sealed for 24 hours to prevent evaporation of the water during gelation. Before electro-characterization, the PEDOT:$HAS_4$-$PBA_{0.3}$/ADH hydrogels were immersed in three successive PBS baths for at least 4 hours to remove the reaction byproducts, to adjust the salt concentration of the matrix, and to neutralize the pH of the hydrogel.

All the electrochemical measurements were made with the three-electrode cell described above (the working electrode being the hydrogel electro-grafted on the Pt rod in a PTFE tube; the reference electrode being the conventional Ag/AgCl electrode ([KCl] 3M) for aqueous measurements;

the counterelectrode being a platinum sheet). All the experiments were performed in freshly prepared and degassed PBS. All the electrochemical measurements were carried out with an SP-200 potentiostat (BioLogic, Seyssinet-pariset, France), equipped with EC-Lab® software V11.31.

Electrochemical Measurements

Charge Storage Capacity (CSC)

The value of charge storage capacity (CSC) is an indicator of the charge transfer capacities of an electrode material, and is useful for estimating the amount of charge that an electrode can "store" before being injected in the electrolyte, where the redox reactions take place.

Cyclic voltammetry (CV) experiments were carried out at a scan rate v=50 mV/s from −0.5 to 0.6 V, starting from 0 V relative to the open circuit potential ($E_{OC}$). 10 cycles were carried out; the signal had stabilized at about the 8th cycle. In the literature, CSC is given in $mC/cm^2$, as the electro-characterized materials are often regarded as two-dimensional. Their active surface is considered equal to the contact surface between the material and the conductive materials.

In the case of the test that was carried out, the electroactive part of the material cannot be regarded as two-dimensional. Consequently, CSC is given in $mC/cm^3$. For comparison with the values in the literature, they were also calculated in $mC/cm^2$, according to the following equations:

$CSC_{2D}=-1/(vxS_{electrode})\int IdVi<0$ where $S_{electrode}$ is the area of contact between the gel and the *Pt* surface (3.14 $mm^2$ in this test).

$CSC_{3D}=-1/(vx\ V_{hydrogel})\int IdVi<0$ where $V_{hydrogel}$ is the volume of the hydrogel (6 μL in our case).

Figure 9:
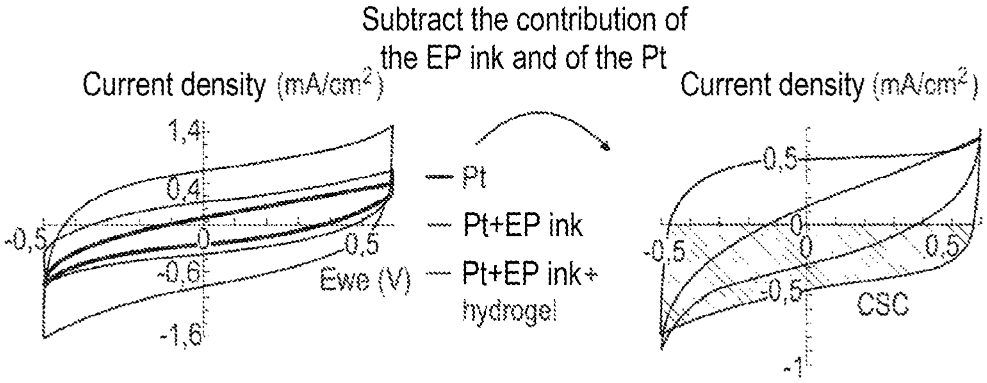
FIG. 9 shows the cyclic voltammograms obtained according to example 8, for the platinum electrode, for the electropolymerized electrode prefunctionalized with PEDOT: $HAS_4$-$PBA_{0.3}$ ("EP ink") and for the final electrode containing the PEDOT:$HAS_4$-$PBA_{0.3}$/ADH conductive hydrogel.

To evaluate the real contribution of the PEDOT:$HAS_4$-$PBA_{0.3}$/ADH conductive hydrogel to the measured current, the cyclic voltammogram of the initial bare platinum electrode ("Pt") and the cyclic voltammogram of the electrode pre-functionalized with electropolymerized PEDOT:$HAS_4$-$PBA_{0.3}$ ("EP ink") were also recorded. The signal of the PEDOT:$HAS_4$-$PBA_{0.3}$/ADH conductive hydrogel was deduced by subtracting the signal from the EP ink+Pt from the signal from the hydrogel. The 9th cycle is presented in FIG. 9.

$CSC_{2D}$ of hydrogel 5 was calculated at 9.6±2.6 $mC/cm^2$. The cyclic voltammogram of the PEDOT:$HAS_4$-$PBA_{0.3}$/ADH conductive hydrogel is displayed after correction for almost constant cathodic and anodic current plateau, characteristic of capacitive behavior.

This CSC value is greater than $CSC_{2D}$ reported for other conductive hydrogels based on PEDOT, such as PEDOT:PSS/alginate hydrogels doped with multi-wall carbon nanotubes developed by Wang et al. ($CSC_{2D}$=0.5-1.2 $mC/cm^2$). Relative to the traditional hard electrode, the CSC value of hydrogel 5 is competitive ($CSC_{sprayed\ iridium\ oxide\ film}$=23 $mC/cm^2$ [52], $CSC_{Platinum}$=0.550 $mC/cm^2$ [56], coatings $CS_{Ccoating\ PEDOT\text{-}PSS\ on\ ITO}$=3.6 $mC/cm^2$ [57]).

Charge Injection Capacity (CIC)

The charge injection capacity (CIC) of an electrode is defined as the amount of charge that the electrode can inject per unit of surface area without causing irreversible electrochemical reactions or tissue lesions. This value is important in tissue stimulation as it must never be exceeded. The main risk is exceeding the hydrolysis potential of water, which could trigger local formation of gas bubbles, which might prove fatal in the case of a bioelectronic device implanted in the brain, for example.

Like CSC, CIC is given in $mC/cm^2$ (designated $CIC_{2D}$), but with the conductive hydrogels in mass prepared according to the invention, it was more important to define the volumetric CIC ($CIC_{3D}$ in $mC/cm^3$).

Figure 10:
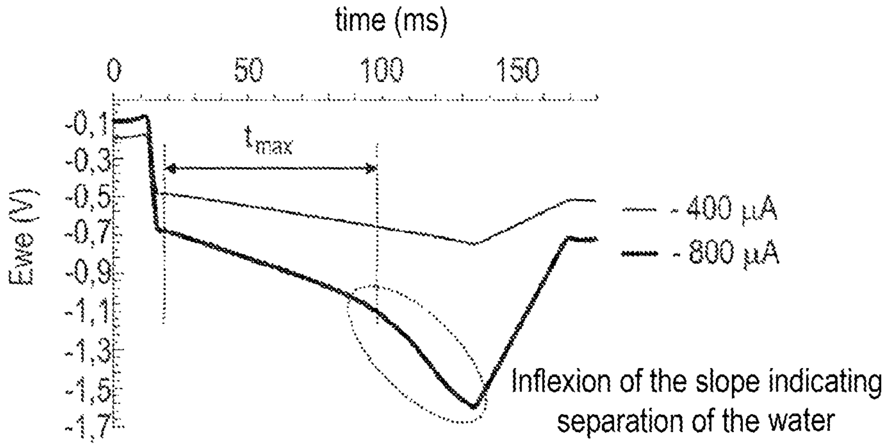
FIG. 10 shows the cathode pulse experiments performed on the PEDOT:$HAS_4$-$PBA_{0.3}$/ADH hydrogels according to example 8 for studying its CIC, with appearance of an inflection point of potential for current amplitude of −800 μA.

The charge injection capacity was determined in pulse experiments. The sequence of pulses was made up of a pulse of cathodic current of 125 ms followed by a rest time of 30 ms, then a charge-compensating anodic pulse of 250 ms, followed by a rest time of 1 second. This sequence was repeated 30 times. The potential of the working electrode was recorded over time. The amplitude of the pulses of current $A_{current\ pulse}$ was increased gradually, until an inflection of the potential of the working electrode during the cathodic pulse was observed, indicating the start of the reaction of hydrolysis of water (FIG. 10). The time between the start of the cathodic pulse and the appearance of the inflection was defined as $t_{max}$. The surface and volumetric charge injection capacities $CIC_{2D}$ and $CIC_{3D}$ were defined as follows:

$$CIC_{2D}=t_{max}\times A_{current\ pulse}/S_{hydrogel}$$

$$CIC_{3D}==t_{max}\times A_{current\ pulse}/V_{hydrogel}$$

The PEDOT:$HAS_4$-$PBA_{0.3}$/ADH hydrogel displayed $CIC_{2D}$ values of 2.5±0.2 $mC/cm^2$ ($CIC_{3D}$≈13.1±1.0 $mC/cm^3$). These values of $CIC_{2D}$ are competitive with the $CIC_{2D}$ of a PEDOT:PSS film electropolymerized on ITO glass plate (3.6 $mC/cm^2$ [57]), and two orders of magnitude less than the $CIC^{2D}$ measured for the PEDOT:PSS hydrogel doped with ethylene glycol and crosslinked by GOPS, reported by Fanelli et al. (263.6±247.5 $mC/cm^2$). However, the hydrogels that have been developed have a $CIC_{2D}$ greater than that of the conventional PtIr or Pt electrodes used for tissue stimulation (about 100 $C/cm^2$ or 34-54 $\mu C/cm^2$ respectively). They may therefore be used in tissue stimulation.

Impedance Spectroscopy

Experiments of electrical impedance spectroscopy (EIS) were carried out to evaluate the electrical response of the PEDOT:$HAS_4$-$PBA_{0.3}$/ADH hydrogel to a harmonic perturbation of potential, typically a sinusoidal signal, over a wide range of frequencies (mHz-GHz). By comparing the amplitude and phase of the input signal and the amplitude and phase of the output signal, the electrochemical impedance Z of the system can be deduced. For tissue monitoring, a low electrode impedance is crucial for acquisition of high-quality signals in vivo [59]. Moreover, it is necessary to avoid faradic reactions and increase the signal/noise ratio [60], which should be around 5 for quality measurements [52]. For tissue stimulation, a low impedance is also required to ensure a reliable and reversible charge injection [61]. In neuronal recording, the local field potentials vary at frequencies from 1 to 300 Hz, whereas the action potentials are triggered at 300-3000 Hz [62]. Consequently, the impedance at 1 KHz is generally reported for determining the recording quality of the electrodes.

The impedance spectroscopy (EIS) experiments were carried out from 100 kHz to 10 mHz, sampling 10 points per decade, using a sinusoidal signal at 0 V versus $E_{OC}$ (open circuit potential) of RMS amplitude 10 mV. Before acquisition of the EIS, an open circuit experiment was carried out to evaluate whether the potential of the conductive hydrogel was stable.

Figure 11:
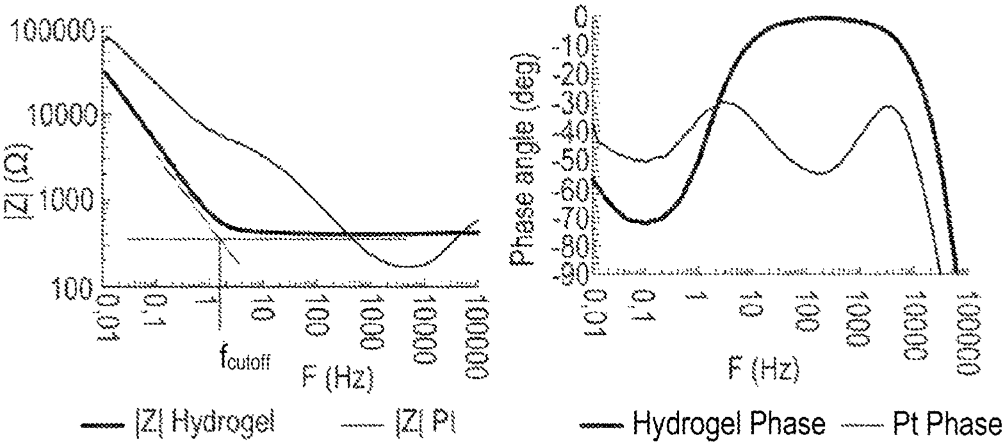
FIG. 11 shows the Bode diagrams of the PEDOT:$HAS_4$-$PBA_{0.3}$/ADH hydrogel and of platinum (Impedance |Z|; phase)

Bode diagrams were plotted for the PEDOT:$HAS_4$-$PBA_{0.3}$/ADH hydrogel and for a platinum electrode for comparison (FIG. 11). The values extracted from the curves are summarized in the following table.

TABLE 5

| Impedance properties of the hydrogels (average for the three hydrogels) | | | |
|---|---|---|---|
| Samples | $f_{cutoff}$ (Hz) | \|Z\| at 1 kHz | Phase at 1 kHz |
| Hydrogel | 2 ± 1 | 412 ± 35 | −2 ± 1 |
| Pt rod | NA | 222 ± 10 | −40 ± 1 |

The PEDOT:$HAS_4$-$PBA_{0.3}$/ADH hydrogel displays an impedance at 1 kHz of 412±35Ω with a cutoff frequency $f_{cutoff}$ of 2±1 Hz (FIG. 11*a*), and a phase from 10 Hz to 1000 Hz close to 0 (—2±1°, average for the three hydrogels), which was in agreement with the average impedance at 1 kHz for the interpenetrating conductive hydrogels based on PEDOT reported in the literature ($10^3$-$10^5$Ω), but above the impedance reported at 1 KHz for the pure conductive hydrogels based on PEDOT (80-300Ω). In all cases, this impedance may be considered to be "low", as it is located in the lowest part of the acceptable impedance range for tissue stimulation/monitoring. The PEDOT:$HAS_4$-$PBA_{0.3}$/ADH hydrogel is therefore promising for tissue stimulation and/or monitoring.

8.2.4. Characterization of the Degradability of the Hydrogel

Figure 12:
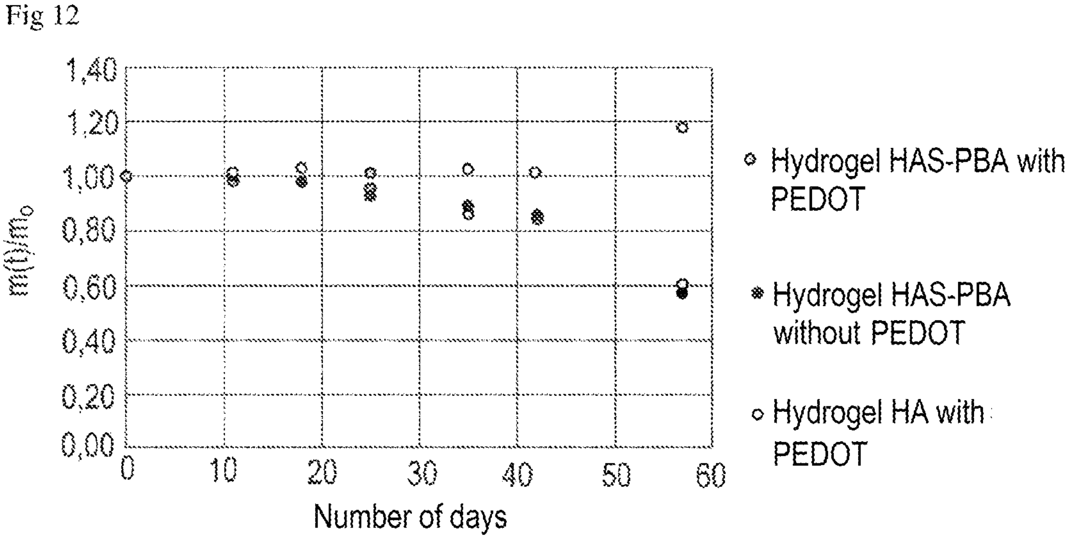
FIG. 12 shows the weight loss ($m(t)/m_0$) during incubation of the PEDOT:$HAS_4$-$PBA_{0.3}$/ADH, $HAS_4$-$PBA_{0.3}$/ADH and PEDOT:HA/ADH hydrogels as a function of time, following the degradability test presented in example 8.

The degradability of the PEDOT:$HAS_4$-$PBA_{0.3}$/ADH hydrogel, the $HAS_4$-$PBA_{0.3}$/ADH hydrogel and the PEDOT:HA/ADH hydrogel was evaluated in PBS buffer at 37° C., tracing their weight loss time during incubation (FIG. 12). In accordance with the study of degradability of the samples of HA and HAS-PBA (see 1), the hydrogel comprising the modified HA, $HAS_4$-$PBA_{0.3}$, is degraded slowly in PBS, in contrast to the PEDOT:HA/ADH hydrogel comprising unmodified HA.

The $m(t)/m_0$ values are reported in the following Table 6.

TABLE 6

| values of weight loss (m(t)/m0) of the hydrogels as a function of the number of days of incubation | | | |
|---|---|---|---|
| Number of days of incubation | PEDOT:HA/ ADH hydrogel | PEDOT:$HAS_4$-$PBA_{0.3}$/ADH hydrogel | $HAS_4$-$PBA_{0.3}$/ ADH hydrogel |
| Start 0 | 1 | 1 | 1.00 |
| 11 | 1.02 | 0.98 | 1.00 |
| 18 | 1.03 | 0.98 | 0.98 |
| 25 | 1.01 | 0.95 | 0.93 |
| 35 | 1.03 | 0.86 | 0.89 |
| 42 | 1.01 | 0.84 | 0.85 |
| 57 | 1.18 | 0.60 | 0.57 |

Example 9

Preparation of an Ink for Inkjet Printing 9.1. Preparation of the Modified Hyaluronic Acid $HAS_4$-$PBA_{0.3}$-$PEGene_{0.17}$ The same protocol as that described for preparation of the modified hyaluronic acid $HAS_4$-$PBA_{0.3}$-$PEGene_{0.16}$, described in example 3, was used for synthesis of the modified hyaluronic acid $HAS_4$-$PBA_{0.3}$-$PEGene_{0.17}$.

$HAS_4$ (1 g; 1.23 mmol) was dissolved in 292 mL of water. 203 mL of DMF was added slowly. DMTMM (0.51 g; 1.85 mmol), 3APBA (70 mg; 0.37 mmol) and PEGene (460 mg; 0.74 mmol) were dissolved separately in 4 mL of water each. The DMTMM solution was added to the reaction mixture, then the 3APBA solution, and then the PEGene solution. The pH was adjusted to 6.5 and the mixture was stirred for 24 hours at room temperature. After adding NaCl to give $[NaCl]_{final}$=0.3 M, the product was purified by ultrafiltration against water treated by osmosis, using a 10 kDa ultrafiltration membrane.

The $HAS_4$-$PBA_{0.3}$-$PEGene_{0.17}$ was recovered after lyophilization at a yield of 90%.

The degrees of substitution of PBA and PEGene, $DS_{PBA}$ and $DS_{PEGene}$, were calculated as described in example 3, by $^1H$ NMR integration, and are $DS_{PBA}$=0.3 and $DS_{PEGene}$=0.17.

The reaction for preparation of $HAS_4$-$PBA_{0.3}$-$PEGene_{0.17}$ is shown schematically below.

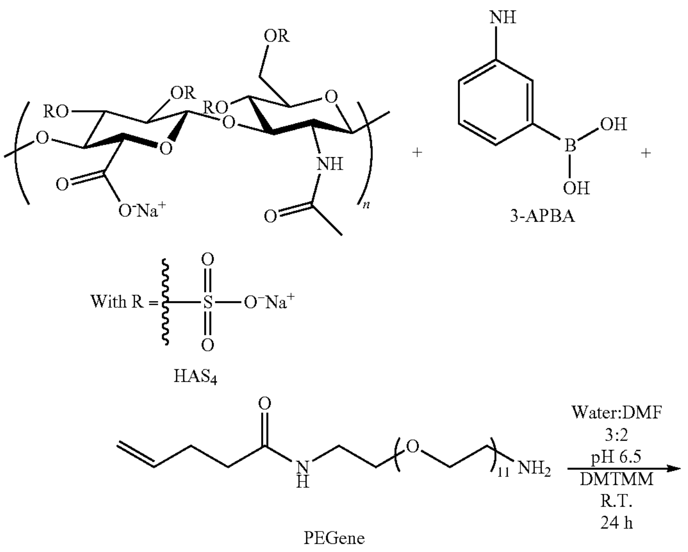

3-APBA $HAS_4$

PEGene

-continued

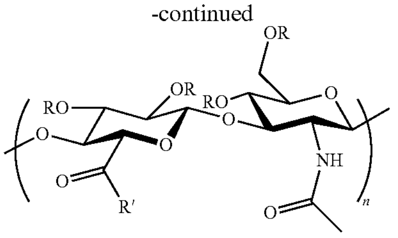

R = $O^-Na^+$ or

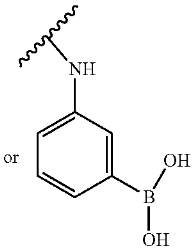

or

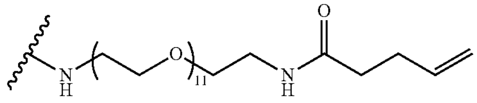

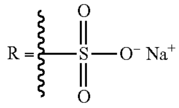

$HAS_4$-$PBA_{0.3}$-$PEGene_{0.17}$

Synthesis of PEDOT:$HAS_4$-$PBA_{0.3}$-$PEGene_{0.17}$ $HAS_4$-$PBA_{0.3}$-$PEGene_{0.17}$ (1 g, 1.03 mmol) was dissolved in 138 mL of degassed water. EDOT (440.5 μL (586 mg), 4.12 mmol) was added to obtain a concentration [HAS-PBA-PEGene+EDOT]=20 g/L. $FeSO_4$ (5.7 mg, 0.02 mmol) and APS (1.251 g, 5.48 mmol) were dissolved in 10 mL of degassed water and added in one go to the solution of HAS-PBA-PEGene. Quickly thereafter, the solution was stirred for 10 minutes at 25 000 rpm using an Ultra Turrax T-10 basic dispersing machine with an S 10 N-8G dispersing tool (Roth, Karlsruhe, Germany). After mixing, the solution was stirred at room temperature under nitrogen, until stable pH below 1.4-1.5 was obtained (about 18 hours). The mixture was dialyzed against deionized water with a 6-8 kDa membrane, changing the bath until the conductivity of the water was less than 8 μS/cm. Then the pH was adjusted to 7.40 by adding 1M NaOH. The mixture was then filtered successively through cellulose acetate membrane filters of 3 μm, 1.2 μm and 0.8 μm if possible, to remove large aggregates. The PEDOT:HAS-PBA-PEGene was recovered by lyophilization as a deep blue powder, at a yield of about 94%.

The formation of PEDOT:HAS-PBA-PEGene is shown schematically below.

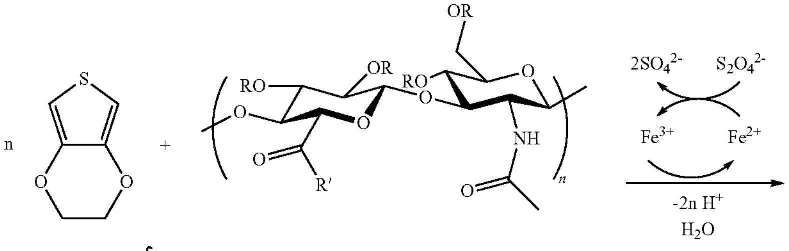

R' = $O^-Na^+$ or

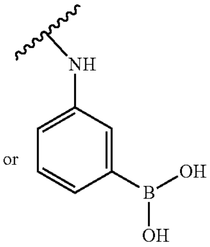

or

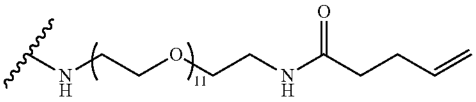

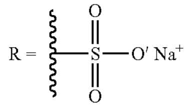

-continued

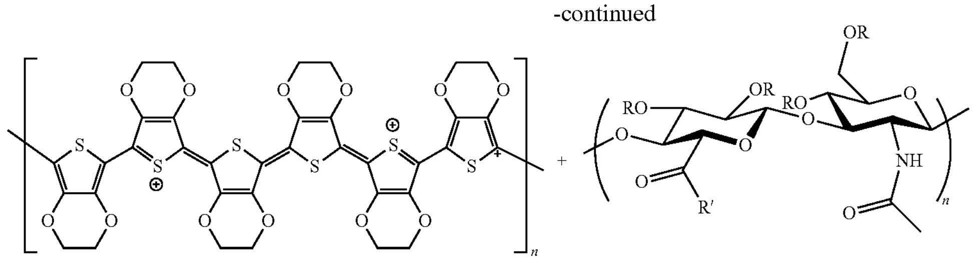

R = $O^-Na^+$ or 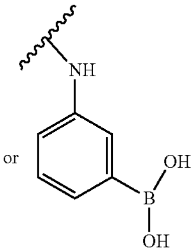 or 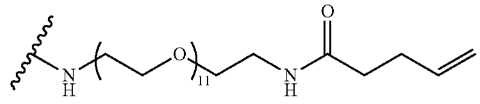

R = 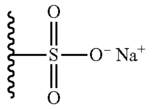

PEDOT:$HAS_4$-$PBA_{0.3}$-$PEGene_{0.17}$ 9.2. Formulation of an Ink for Inkjet Printing A solution "S" of water containing 2 g/L of dodecylbenzene sulfonic acid (DBSA) and 2.3 vol % of glycerol was prepared. 10 mg of $HAS_4$-$PBA_{0.3}$-$PEGene_{0.17}$ was dissolved in 932.4 μL of solution S. 17.6 μL of a 100 g/L solution of PEG-$(SH)_2$ ($M_n$=3.5 kg/mol, marketed by Interchim) was dissolved in solution S (thiol/alkene=0.9), and 50 μL of a 20 g/L solution of photoinitiator LAP dissolved in water was added to the solution of HAS-PBA-PEGene. The mixture was stirred in a vortex stirrer and sonicated for 30 seconds in an ultrasonic bath before printing.

9.3. Test of Inkjet Printing and Photo-Crosslinking of Tracks

The interconnections were printed using a Dimatix Material Printer DMP-2831 from Fujifilm with cartridges with drop size of 10 pL. After stirring the ink in the vortex stirrer and sonication for 30 seconds, about 1 mL of ink was added to the cartridge. The conductive lines with a length of 1-2 cm were printed on glass functionalized with thiol functions or on a PEG/chitosan hydrogel film having alkene groups on the surface fixed on a tape substrate. The printing parameters are as follows: substrate temperature 25° C., printhead temperature 25° C., drop-to-drop spacing of 25 μm, 2 printing nozzles and an applied potential of about 25 V on the printing nozzles. After printing 20 layers, the sinusoidal tracks were exposed to UV radiation (2=405 nm, power=75 $mW/cm^2$) for 3 minutes and dried overnight. The ink is stable for several hours (>2 hours), rinsing regularly with water.

Figure 13:
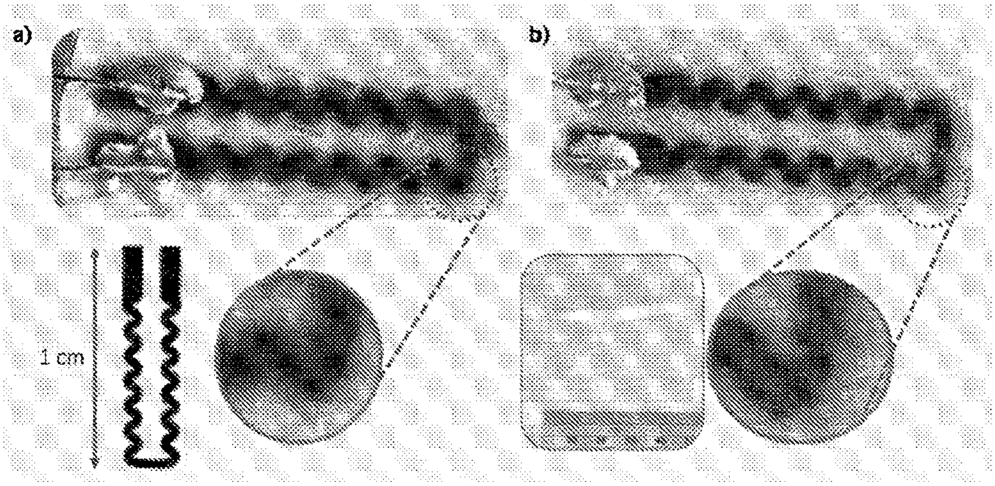
FIG. 13 shows the microscope images of the conductive and water-resistant sinusoidal tracks formed according to example 9, by inkjet printing of an aqueous suspension of PEDOT:$HAS_4$-$PBA_{0.3}$-$PEGene_{0.17}$/PEG on a glass plate functionalized with thiol functions (a) and on a film of PEG/chitosan hydrogel (b).

FIG. 13 shows the microscope images of the sinusoidal conductive tracks formed on the glass plate functionalized with thiol functions (a) and on the PEG/chitosan hydrogel film (b).

REFERENCES

[1] Matsuhisa et al., Chemical Society Reviews 48, 2946-2966 (2019);
[2] Liu et al., ACS nano 11, 9614-9635 (2017);
[3] Kros et al., Sensors and Actuators B: Chemical 106, 289-295 (2005);
[4] Miriani et al., Annu. Int. Conf. IEEE Eng. Med. Biol. Soc., 2008, 1841-1844;
[5] Bodart et al. ACS Appl. Mater. Interfaces 11, 17226-17233 (2019);
[6] Proctor et al. Advanced Biosystems 3, 1800270 (2019);
[7] Ludwig et al., J. Neural Eng. 8, 014001 (2011);
[8] Spencer et al., ACS Appl. Mater. Interfaces 16 (2019);
[9] Heo et al., Materials Science and Engineering: C99, 582-590 (2019);
[10] Garma et al., Lab on a Chip 19, 3776-3786 (2019);
[11] ElMahmoudy et al., Macromolecular Materials and Engineering 302, 1600497 (2017);
[12] Xu et al., ACS Applied Materials & Interfaces 10, 14418-14425 (2018);
[13] Zhang et al., Advanced Materials 32, 1904752 (2020);
[14] Ner et al., Synthetic Metals 160, 351-353 (2010);
[15] Tekoglu et al., Adv. Mater. Technol. 5, 1900699 (2020);
[16] Horikawa et al., J. Mater. Chem. C3, 8881-8887 (2015);
[17] Hofmann et al., Macromolecules 50, 1959-1969 (2017);
[18] Del Agua et al., ACS Macro Letters 6, 473-478 (2017);
[19] Hernandez-Suarez et al., MRC 9, 218-223 (2019);
[20] Zamora-Sequeira et al., Carbohydrate Polymers 189, 304-312 (2018);
[21] Molino et al., Biomaterials Science 6, 1250-1261 (2018);
[22] Kim et al., Journal of Neuroscience Methods 326, 108369 (20149);
[23] Harman et al., Acta biomaterialia 14, 33-42 (2015);
[24] Purcell et al., Biomater. Sci. 2, 693-702 (2014);
[25] Feng et al., Acta Biomaterialia 53, 329-342 (2017);
[26] Hintze et al., Biomacromolecules 10, 3290-3297 (2009);
[27] Möller et al., Carbohydrate Polymers 90, 608-615 (2012);
[28] Barbucci et al., Macromolecular Symposia 105, 1-8 (1996);

[29] Kunze et al., Glycoconjugate Journal 27, 151-158 (2010);
[30] Dodgson et al. Biochemical Journal 84, 106-110 (1962);
[31] Frazier et al., Open Glycoscience 1, 31-39 (2008);
[32] Platzer et al., Journal of Pharmaceutical and Biomedical Analysis 21, 491-496 (1999);
[33] Tarus et al., Macromolecular Rapid Communications 35, 2089-2095 (2014);
[34] Figueiredo et al., Biomacromolecules 2020, 21, 1, 230-239;
[35] Deng et al., Nanoscale, 2020, 12, 1224;
[36] Xu et al., ACS Appl. Mater. Interfaces 2019, 11, 8;
[37] Hao et al., Polym Int. 2017, 66 (12): 1787-1799;
[38] Lee et al., Soft Matter, 2008, 4, 880-887;
[39] Matione et al., ACS Macro Lett. 2019, 8, 285-288;
[40] Xu et al., J. Mater. Chem, 2012, 22, 8579;
[41] Zhou et al., Materials Chemistry and Physics 208 (2018) 91-96;
[42] Su et al., Synthetic Metals 160 (2010) 2471-2475;
[43] Luo et al., ACS Nano 2012, 6, 4, 3018-3026;
[44] Luo et al., Langmuir, vol. 24, No. 15, 2008;
[45] Mo-Yuan Shen et al., J. Chin. Chem. Soc. 2018, 65, 149-155;
[46] Sassi et al., Org. Lett., Vol. 15, No. 14, 2013.
[47] Wei et al., J. Mater. Chem. B, 2015, 3, 5028-5034;
[48] Mantione et al., Polymers 2017, 9, 354;
[49] Mooney, Journal of Applied Physics 1940, 11, 582-592;
[50] Lin et al., Macromolecules 2010, 43, 2554-2563;
[51] Eda et al., Nature Nanotechnology 2008, 3, 270-274;
[52] Cogan et al., Annu. Rev. Biomed. Eng. 2008, 10, 275-309;
[53] Cogan et al., IEEE Trans. Biomed. Eng., 2005, 52, 1612-1614;
[54] Boehler et al., Nat Protoc 2020, 15, 3557-3578;
[55] Xu et al., Adv. Healthcare Mater. 2019, 8, 1801649;
[56] Wang, et al., Composite Interfaces 2019, 26, 27-40;
[57] Nyberg et al., Journal of Neuroscience Methods 2007, 160, 16-25;
[58] Fanelli et al., Adv. Mater. Technol. 2021, 2100176.
[59] Wang et al., Nano Res. 2018, 11, 5065-5106;
[60] Castagnola et al., Front. Neuroeng. 2014, 7, 38-43;
[61] Merrill et al., Journal of Neuroscience Methods 2005, 141, 171-198;
[62] Du et al., J. Mater. Chem. C 2015, 3, 6515-6524.

The invention claimed is:

1. A method of doping a first polymer, the method comprising:

doping the first polymer with a modified hyaluronic acid polymer, which is modified by grafting onto a hyaluronic acid polymer at least —$SO_3^-$ functions and aromatic rings, wherein the first polymer comprises, in reacted form, 3,4-ethylenedioxythiophene (EDOT), wherein the modified hyaluronic acid polymer has an average number of $SO_3^-$ functions per repeat unit of hyaluronic acid of 4, and an average number of aromatic rings per repeat unit of the hyaluronic acid of 0.3, and wherein the aromatic ring results from the grafting of aminophenylboronic acid with a carboxylic acid function of the hyaluronic acid.

2. The method of claim 1, wherein the hyaluronic acid has a weight-average molecular weight, Mw, in a range of from 20,000 to 1,000,000 g/mol.

3. The method of claim 1, wherein the modified hyaluronic acid polymer further comprises a crosslinkable function.

4. The method of claim 3, wherein the modified hyaluronic acid polymer has an average number of crosslinkable functions grafted per repeat unit of hyaluronic acid in a range of from 0.05 to 0.50.

5. The method of claim 3, wherein the crosslinkable functions of the modified hyaluronic acid polymer are carried by at least some groups bearing at least one aromatic ring, grafted to the modified hyaluronic acid polymer, and/or separate grafts of group(s) bearing —$SO_3^-$ function(s) and/or aromatic ring(s).

6. A material, comprising:

the first polymer made by the method of claim 1.

7. The material of claim 6, which is a hydrogel formed from the first polymer, wherein the modified hyaluronic acid polymer comprises a crosslinkable function and/or a free carboxylic acid function.

8. A bioelectronic device or biosensor, configured to be brought into contact with biological material, comprising:

a material comprising the first polymer formed by the method of claim 1.

9. A method for preparing a hydrogel, the method comprising:

(a-i) submitting an aqueous suspension, optionally as an ink, to conditions that are favorable for the crosslinking of chains of modified hyaluronic acid to form a hydrogel swollen in an aqueous medium; and, optionally, (a-ii) submitting the hydrogel swollen in an aqueous medium to a drying, to obtain a dry hydrogel, or (b-i) polymerizing 3,4-ethylenedioxythiophene (EDOT), 3,4-propylenedioxythiophene (ProDOT), and/or a derivative thereof, in a hydrogel swollen in an aqueous medium; and, optionally (b-ii) submitting the hydrogel obtained after the polymerizing (b-i) to a drying, to obtain a dry hydrogel, or (c-i) subjecting an aqueous suspension to conditions that are favorable for polymerizing the EDOT, ProDOT, and/or derivative and for crosslinking of chains of modified hyaluronic acid to form the hydrogel swollen in an aqueous medium; and optionally (c-ii) submitting the hydrogel obtained after the subjecting (c-i) to a drying to obtain a dry hydrogel, wherein the aqueous suspension comprises a first polymer comprising, in polymerized form, EDOT, ProDOT, and/or a derivative thereof, and, as a dopant, a modified hyaluronic acid polymer comprising crosslinkable function and/or a free carboxylic acid function, wherein the modified hyaluronic acid polymer is modified by grafting onto a hyaluronic acid polymer at least $SO_3^-$ functions and aromatic rings, and wherein the hydrogel is formed from the first polymer.

10. The method of the claim 9, comprising:

(b-i) the polymerizing of the EDOT, ProDOT, and/or derivative in the hydrogel swollen in the aqueous medium; and, optionally (b-ii) submitting the hydrogel obtained after the polymerizing (b-i) to the drying, to obtain the dry hydrogel, wherein the hydrogel in (b-i) is swollen in an aqueous medium, comprises the modified hyaluronic acid polymer comprising the crosslinkable function and/or free carboxylic acid function.

11. The method of claim 10, wherein the polymerizing (b-i) comprises soaking the hydrogel swollen in an aqueous medium based on modified hyaluronic acid of EDOT and/or ProDOT monomers, and then subjecting the hydrogel impregnated with the EDOT and/or ProDOT monomers to conditions that are favorable for the polymerization of the EDOT and/or ProDOT monomers.

12. The method of claim 9, wherein the modified hyaluronic acid bears reactive functions X, wherein crosslinking of the chains of the modified hyaluronic acid is carried out in the presence of at least one crosslinking agent bearing at least two reactive functions Y, the functions X and Y being identical or different, each of the functions Y being able to react with a reactive function X of the modified hyaluronic acid polymer, to form a physical or chemical bond.

13. The method of claim 9, comprising:

(c-i) the subjecting of the aqueous suspension to conditions favorable for the polymerizing of the EDOT, ProDOT, and/or derivative and for crosslinking of chains of modified hyaluronic acid to form the hydrogel swollen in the aqueous medium; and optionally (c-ii) submitting the hydrogel obtained after the subjecting (c-i) to the drying to obtain the dry hydrogel, wherein the aqueous suspension comprises EDOT and/or ProDOT, the modified hyaluronic acid polymer comprising free carboxylic acid functions, a catalyst suitable for polymerizing EDOT and/or ProDOT monomers, and a crosslinking agent.

14. The method of claim 13, wherein the crosslinking agent comprises at least two primary amine or hydrazide functions, wherein the subjecting (c-i) to crosslinking of the chains of the modified hyaluronic acid is initiated by adding, to the aqueous suspension, an activating agent for the carboxylic acid functions.

15. The method of claim 9, wherein the hydrogel is in film form, and wherein the aqueous suspension, optionally as the solution, is applied to a surface of a substrate, before crosslinking of the chains of the modified hyaluronic acid.

16. The method of claim 15, wherein the hydrogel film is bonded covalently to the surface of the substrate.

17. The method of claim 9, comprising:

(a-i) the submitting of the aqueous suspension, optionally as the ink, to the conditions favorable for the crosslinking of the chains of the modified hyaluronic acid to form the hydrogel swollen in the aqueous medium; and, optionally, (a-ii) the submitting of the hydrogel swollen in the aqueous medium to the drying, to obtain the dry hydrogel.

18. A method of doping a first polymer, the method comprising:

doping the first polymer with a modified hyaluronic acid polymer, which is modified by grafting onto a hyaluronic acid polymer at least $—SO_3^-$ functions and aromatic rings, wherein the first polymer comprises, in reacted form, 3,4-ethylenedioxythiophene (EDOT), 3,4-propylenedioxythiophene (ProDOT) and/or a derivative thereof, and wherein the modified hyaluronic acid polymer further comprises a crosslinkable function.

19. The method of claim 18, wherein the modified hyaluronic acid polymer has an average number of crosslinkable functions grafted per repeat unit of hyaluronic acid in a range of from 0.05 to 0.50.

20. The method of claim 18, wherein the crosslinkable functions of the modified hyaluronic acid polymer are carried by at least some groups bearing at least one aromatic ring, grafted to the modified hyaluronic acid polymer, and/or separate grafts of group(s) bearing $—SO_3^-$ function(s) and/or aromatic ring(s).

21. An aqueous suspension, called ink, comprising:

a polymer comprising, in polymerized form, 3,4-ethylenedioxythiophene (EDOT), wherein the polymer is doped with at least one modified hyaluronic acid polymer, which is modified by grafting onto a hyaluronic acid polymer at least $—SO_3^-$ functions and aromatic rings, wherein the modified hyaluronic acid polymer has an average number of $SO_3^-$ functions per repeat unit of hyaluronic acid of 4, and an average number of aromatic rings per repeat unit of the hyaluronic acid of 0.3, and wherein the aromatic ring results from the grafting of aminophenylboronic acid with a carboxylic acid function of the hyaluronic acid.

22. A method for preparing the aqueous suspension, or ink, of claim 21, the method comprising:

polymerizing a monomer comprising the EDOT, in a solution comprising the modified hyaluronic acid polymer in an aqueous medium, to obtain the polymer.

23. The method of claim 22, wherein the EDOT and the modified hyaluronic acid polymer are used in a molar ratio of the EDOT to units of the modified hyaluronic acid in a range of from 0.5 to 5.

24. A method of doping a first polymer, the method comprising:

doping the first polymer with a modified hyaluronic acid polymer, which is modified by grafting onto a hyaluronic acid polymer at least $—SO_3^-$ functions and aromatic rings, wherein the first polymer comprises, in reacted form, 3,4-ethylenedioxythiophene (EDOT), 3,4-propylenedioxythiophene (ProDOT) and/or a derivative thereof, wherein the modified hyaluronic acid polymer has formula (I):

(I)

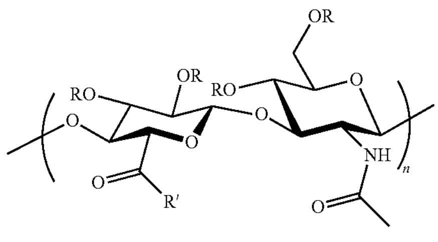
, wherein n is degree of polymerization of the hyaluronic acid polymer, R is independently H or a group —$SO_3^-C^+$, $C^+$ being a counterion of the —$SO_3^-$; anion, R optionally differing from one repeat unit to another, provided that at least some of the groups R are —$SO_3^-$ $C^+$, R', independently from one repeat unit to another, are:

$O^-C^+$, $C^+$ being a counterion of the $O^-$ anion, a group bearing an aromatic ring and optionally at least one crosslinkable function, and a group bearing at least one crosslinkable function, provided that at least some of the R' are groups bearing an aromatic ring.

* * * * *